(12) United States Patent
Sundaram et al.

(10) Patent No.: US 8,850,203 B2
(45) Date of Patent: Sep. 30, 2014

(54) SECURE KEY MANAGEMENT IN MULTIMEDIA COMMUNICATION SYSTEM

(75) Inventors: Ganapathy S. Sundaram, Hillsborough, NJ (US); Violeta Cakulev, Milburn, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 797 days.

(21) Appl. No.: 12/549,932

(22) Filed: Aug. 28, 2009

(65) Prior Publication Data

US 2011/0055567 A1    Mar. 3, 2011

(51) Int. Cl.
*H04L 9/32* (2006.01)
*H04L 9/08* (2006.01)
*H04L 9/30* (2006.01)
*H04L 29/06* (2006.01)

(52) U.S. Cl.
CPC ............ *H04L 63/306* (2013.01); *H04L 9/0833* (2013.01); *H04L 9/0847* (2013.01); *H04L 9/3073* (2013.01); *H04L 2209/80* (2013.01); *H04L 9/0894* (2013.01); *H04L 9/0825* (2013.01)
USPC ............ 713/169; 713/170; 713/171; 380/46; 380/282

(58) Field of Classification Search
CPC ....... H04L 9/0847; H04L 9/80; H04L 9/0825; H04L 9/0833; H04L 9/0894; H04L 9/3073; H04L 63/306; H04L 2209/80; H04L 63/0428; H04L 9/3226
USPC ........... 713/169, 171, 170; 380/46 D, 282, 46
See application file for complete search history.

(56) References Cited

U.S. PATENT DOCUMENTS

| | | | |
|---|---|---|---|
| 2002/0073229 A1* | 6/2002 | Hayashi | 709/237 |
| 2005/0044365 A1* | 2/2005 | Haukka et al. | 713/171 |
| 2007/0297418 A1 | 12/2007 | Lee | |
| 2009/0034742 A1* | 2/2009 | Appenzeller et al. | 380/279 |

FOREIGN PATENT DOCUMENTS

| | | |
|---|---|---|
| EP | 0952718 A2 | 10/1999 |
| JP | 8018552 A | 1/1996 |
| JP | 2005500740 A | 1/2005 |
| WO | 2009/089738 A | 7/2009 |
| WO | 2009/089738 A1 | 7/2009 |
| WO | PCTUS2010/046342 | 12/2010 |
| WO | PCTUS2010046319 | 10/2011 |

OTHER PUBLICATIONS

Cao et al., "Identity-Based Authenticated Key Agreement Protocols Without Bilinear Pairings," IEICE Transactions on Fundamentals of Electronics, Communications and Computer Sciences, Engineering Sciences Society, Dec. 2008, pp. 3833-3836, vol. E91-A, No. 12.*
Xun Yi, "Identity-Based Fault-Tolerant Conference Key Agreement," IEEE Transactions on Dependable and Secure Computing, Jul.-Sep. 2004, pp. 170-178, vol. 1, No. 3.
Maarit Hietalahti, "A Clustering-Based Group Key Agreement Protocol for Ad-Hoc Networks," Electronic Notes in Theoretical Computer Science, May 2008, pp. 43-53, vol. 192, No. 2.
3GPP (3rd Generation Partnership Project) Technical Report TR 33.828, V1.5.0, Sep. 2009, 68 pages.
D. Boneh et al., "Identity-Based Encryption from the Weil Pairing," CRYPTO 2001, Lecture Notes in Computer Science, 2001, pp. 213-229, vol. 2139.
International Telecommunication Union, Telecommunication Standardization Sector of ITU (ITU-T) Recommendation H.323, Series H: Audiovisual and Multimedia Systems, Jun. 2006, 304 pages.
J. Rosenberg et al., "SIP: Session Initiation Protocol," Internet Engineering Task Force IETF RFC 3261, Jun. 2002, 270 pages.
3GPP (3rd Generation Partnership Project) Technical Specification TS 23.218, V8.4.0, Dec. 2008, 65 pages.
3GPP (3rd Generation Partnership Project) Technical Specification TS 23.228, V9.1.0, Sep. 2009, 252 pages.
3GPP (3rd Generation Partnership Project) Technical Specification TS 24.228, V5.15.0, Sep. 2006, 851 pages.
3GPP (3rd Generation Partnership Project) Technical Specification TS 24.229, V9.1.0, Sep. 2009, 623 pages.

3GPP (3rd Generation Partnership Project) Technical Report TR 24.930, V8.2.0, Dec. 2008, 140 pages.
T. Dierks et al., "The TLS Protocol, Version 1.0," Internet Engineering Task Force IETF RFC 2246, Jan. 1999, 81 pages.
M. Baugher et al., "The Secure Real-Time Transport Protocol (SRTP)," Internet Engineering Task Force IETF RFC 3711, Mar. 2004, 56 pages.
B. Ramsdell, "S/MIME Version 3 Message Specification," Internet Engineering Task Force IETF RFC 2633, Jun. 1999, 32 pages.
S. Kent et al., "IP Encapsulating Security Payload (ESP)," Internet Engineering Task Force IETF RFC 2406, Nov. 1998, 23 pages.
D. Harkins et al., "The Internet Key Exchange (IKE)," Internet Engineering Task Force IETF RFC 2409, Nov. 1998, 42 pages.
C. Kaufman, "Internet Key Exchange (IKEv2) Protocol," Internet Engineering Task Force IETF RFC 4306, Dec. 2005, 99 pages.
P. Hoffman, "Cryptographic Suites for IPsec," Internet Engineering Task Force IETF RFC 4308, Dec. 2005, 7 pages.
3GPP (3rd Generation Partnership Project) Technical Specification TS 33.220, V9.0.0, Jun. 2009, 75 pages.
X. Boyen et al., "Identity-Based Cryptography Standard (IBCS) #1: Supersingular Curve Implementations of the BF and BB1 Cryptosystems," Internet Engineering Task Force IETF RFC 5091, Dec. 2007, 59 pages.
G. Appenzeller et al., "Identity-Based Encryption Architecture and Supporting Data Structures," Internet Engineering Task Force IETF RFC 5408, Jan. 2009, 31 pages.
L. Martin et al., "Using the Boneh-Franklin and Boneh-Boyer Identity-Based Encryption Algorithms with the Cryptographic Message Syntax (CMS)," Internet Engineering Task Force IETF RFC 5409, Jan. 2009, 10 pages.
U.S. Appl. No. 12/372,242 filed in the name of Ganapathy S. Sundaram on Feb. 17, 2009 and entitled "Identity Based Authenticated Key Agreement Protocol."
V. Boyko et al., "Provably Secure Password-Authenticated Key Exchange Using Diffie-Hellman," EuroCrypt 2000, pp. 157-172.
3GPP (3rd Generation Partnership Project) Technical Specification Group Services and System Aspects; IMS Media Plane Security (Release 8),TR 33.828, V1.3,0, May 2009, pp. 1-69.
F. Kerschbaum et al., "RFID-Based Supply Chain Partner Authentication and Key Agreement," Proceedings of the 2nd ACM Conference on Wireless Network Security, Mar. 2009, pp. 41-50, New York, NY.
X. Cao et al., "Identity-Based Authenticated Key Agreement Protocols without Bilinear Pairings," IEICE Transactions on Fundamentals of Electronics, Communications and Computer Sciences, Engineering Sciences Society, Dec. 2008, pp. 3833-3836, Tokyo, Japan.
R.W. Zhu et al., "An Efficient Identity-Based Key Exchange Protocol with KGS Forward Secrecy for Low-Power Devices," Theoretical Computer Science, May 2007, pp. 198-207, vol. 378, No. 2.
M.A. Azim et al., An Efficient Elliptic Curve Cryptography Based Authenticated Key Agreement Protocol for Wireless LAN Security, IEEE, High Performance Switching and Routing Workshop, May 2005, pp. 376-380, Piscataway, NJ.
Mari Ozaki, Ryuichi Sakai, Masao Kasahara, New Key Generation Scheme for Identity based Public key Encryption, The 31st Symposium on Information Theory and its Applications [CD-ROM] (SITA 2008), Japan, Society of Information Theory and its Applications, Oct. 10, 2008, 4.2.3, pp. 404-408.
Toru Inoue, Kohichi Sakurai, "Proposal of conference key sharing method provided with key escrow function," Symposium on Cryptography and Information Security in 2001, Japan, Technical Group on Security of Institute of Electronics, Information and Communication Engineers, Jan. 23, 2001, vol. II of II, pp. 827-832.
Ryuichi Sakai, Kiyoshi Ohgishi, Masao Kasahara, "Cryptographic Schemes based on Pairing over Elliptic Curve," Symposium on Cryptography and Information Security in 2001, Japan, Technical Group on Security of Institute of Electronics, Information and Communication Engineers, Jan. 23, 2001, vol. I of II, pp. 369-373.
"Search report of current situation of personal authentication technique," Japan, Information-technology Promotion Agency Security center [Online, Mar. 2003], pp. 13-18, [Searching on Aug. 17, 2012], Internet, URL, <http://www.ipa.go.jp/security/fy14/reports/authentication/authentication 2002.pdf>.
Kiyoshi Ohgishi, Ryuichi Sakai, Masao Kasahara, "Notes on ID-based Key Sharing Systems over Elliptic Curve," Technical report of IEICE, Japan, The Institute of Electronics, Information, and Communication Engineers, Nov. 8, 1999, vol. 99, No. 414, pp. 37-42.
V. Cakulev, G Sundaram, "IBAKE: Identity-Based Authenticated Key Agreement," Network Working Group Internet-Draft, [online], Oct. 19, 2009, draft-cakulev-ibake-00.txt, [retrieved on Jul. 11, 2013]. Retrieved from the Internet, URL, <http://tools.ietf.org/pdf/draft-cakulev-ibake-00.pdf>.
V. Cakulev, G Sundaram, "MIKEY-IBAKE: Identity-Based Mode of Key Distribution in Multimedia Internet KEYing (MIKEY)," Network Working Group Internet-Draft, [online], Oct. 14, 2009, draft-cakulev-mikey-ibake-00.txt, [retrieved on Jul. 11, 2013]. Retrieved from the Internet, URL, <http://tools.ietf.org/pdf/draft-cakulev-mikey-00.pdf>.

* cited by examiner

*Primary Examiner* — Jung Kim
*Assistant Examiner* — Ayoub Alata
(74) *Attorney, Agent, or Firm* — Ryan, Mason & Lewis, LLP

(57) ABSTRACT

Principles of the invention provide one or more secure key management protocols for use in communication environments such as a media plane of a multimedia communication system. For example, a method for performing an authenticated key agreement protocol, in accordance with a multimedia communication system, between a first party and a second party comprises, at the first party, the following steps. Note that encryption/decryption is performed in accordance with an identity based encryption operation. At least one private key for the first party is obtained from a key service. A first message comprising an encrypted first random key component is sent from the first party to the second party, the first random key component having been computed at the first party, and the first message having been encrypted using a public key of the second party. A second message comprising an encrypted random key component pair is received at the first party from the second party, the random key component pair having been formed from the first random key component and a second random key component computed at the second party, and the second message having been encrypted at the second party using a public key of the first party. The second message is decrypted by the first party using the private key obtained by the first party from the key service to obtain the second random key component. A third message comprising the second random key component is sent from the first party to the second party, the third message having been encrypted using the public key of the second party. The first party computes a secure key based on the second random key component, the secure key being used for conducting at least one call session with the second party via a media plane of the multimedia communication system.

39 Claims, 15 Drawing Sheets

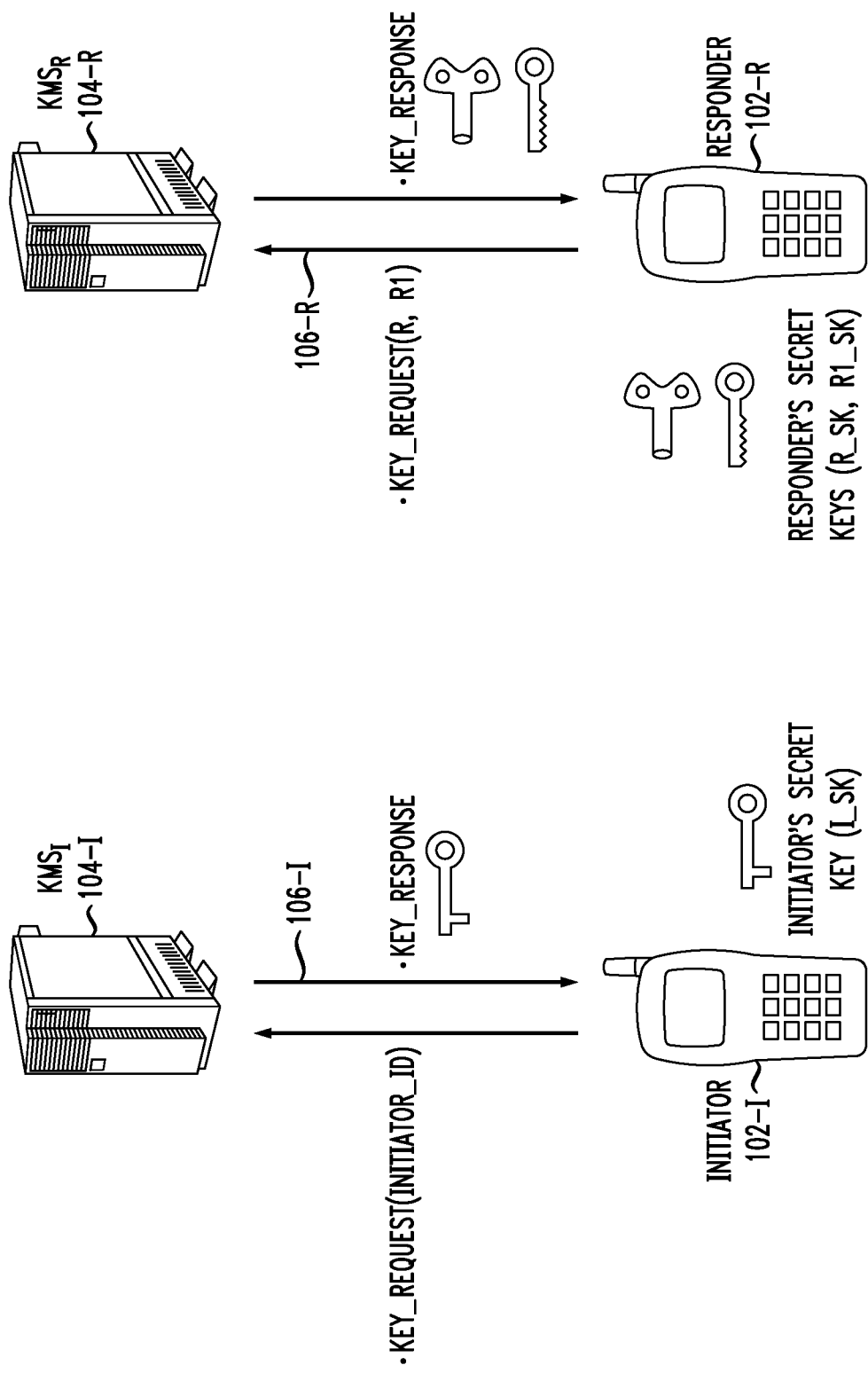

FIG. 11
1100

A's COMPUTING DEVICE 1102
- I/O DEVICES 1108-A
- PROCESSOR 1110-A
- MEMORY 1112-A

NETWORK 1106

B's COMPUTING DEVICE 1104
- I/O DEVICES 1108-B
- PROCESSOR 1110-B
- MEMORY 1112-B

SECURE KEY MANAGEMENT IN MULTIMEDIA COMMUNICATION SYSTEM

CROSS REFERENCE TO RELATED APPLICATION

The present application is related to commonly assigned, concurrently filed U.S. patent application U.S. patent application Ser. No. 12/549907 entitled "Secure Key Management in Conferencing System," the disclosure of which is incorporated by reference herein.

FIELD OF THE INVENTION

The present invention relates generally to communication security and, more particularly, to a secure key management protocol for use in communication environments such as a media plane of a multimedia communication system and a call conferencing system.

BACKGROUND OF THE INVENTION

Existing multimedia applications offered in a multimedia communication system do not support security in the media plane. Concern over media plane security is a relatively new problem.

Existing proposals in a multimedia communication system such as the Internet Protocol (IP) Multimedia Subsystem (IMS) are based on some kind of token based symmetric key methods, managed using a key management server that potentially creates and distributes keys. 3GPP ($3^{rd}$ Generation Partnership Project) Technical Report (TR) 33.828, the disclosure of which is incorporated by reference herein, discusses existing proposals for IMS media plane encryption. However, these existing solutions are not scalable (since the server should be highly available and online all the time), do not provide authentication of entities, and, in addition, escrow keys at the server.

Conversely, non-IMS applications such as SKYPE (tradename of Skype Technologies S.A. of Luxembourg) and other client-to-client multimedia applications provide end-to-end privacy with authentication and no key-escrow. However, the solution relies of the use of certificates which require a highly available public key infrastructure (PKI) which is extremely expensive to manage. Moreover, the solution does not scale well for group conferencing applications, nor does it provide for lawful intercept of communications in the absence of a PKI.

Furthermore, similar key management security concerns exist in conferencing systems where parties participate in call sessions through a conference server.

Thus, a need exists for a secure key management solution for use in communication environments such as a media plane of a multimedia communication system and a call conferencing system.

SUMMARY OF THE INVENTION

Principles of the invention provide one or more secure key management protocols for use in communication environments such as a media plane of a multimedia communication system.

For example, in one aspect, a method for performing an authenticated key agreement protocol, in accordance with a multimedia communication system, between a first party and a second party comprises, at the first party, the following steps. At least one private key for the first party is obtained from a key service.

A first message comprising an encrypted first random key component is sent from the first party to the second party, the first random key component having been computed at the first party, and the first message having been encrypted using a public key of the second party in accordance with an identity based encryption operation.

A second message comprising an encrypted random key component pair is received at the first party from the second party, the random key component pair having been formed from the first random key component and a second random key component computed at the second party, and the second message having been encrypted at the second party using a public key of the first party in accordance with the identity based encryption operation. The second message is decrypted by the first party using the private key obtained by the first party from the key service to obtain the second random key component.

A third message comprising the second random key component is sent from the first party to the second party, the third message having been encrypted using the public key of the second party in accordance with the identity based encryption operation. The first party computes a secure key based on the second random key component, the secure key being used for conducting at least one call session with the second party via a media plane of the multimedia communication system.

One or more of the encrypted messages exchanged between the first party and the second party contain at least one of an identity associated with the first party and an identity associated with the second party.

The step of obtaining the at least one private key from the key service further may comprise an exchange wherein the first party sends a first party identifier to the key service, and receives the at least one private key from the key service which is generated by the key service based on the first party identifier. The exchange between the first party and the key service may be performed based on at least one of: (i) a time-based schedule; (ii) a call session frequency-based schedule; and (iii) a subscription-based schedule.

The first party may obtain two or more private keys from the key service including the at least one private key used for the authenticated key agreement with the second party. Other ones of the two or more private keys obtained by the first party may be useable for performing separate authenticated key agreement operations. The first party may have two or more identities and a separate private key for each of the two or more identities.

The method may further comprise receiving at the first party a fourth message comprising a verification from the second party, the fourth message having been encrypted at the second party using the public key of the first party in accordance with the identity based encryption operation.

The respective public keys used by the first party and the second party to perform the identity based encryption operation may comprise a result of a hash function applied to information indicative of an identity of the respective party to which the public key is assigned and wherein an output of the hash function is a point on an elliptic curve.

The first random key component may be computed from a first random number chosen by the first party and a value selected from a group associated with a given cryptographic key protocol, and the second random key component may be computed from a second random number chosen by the second party and a value selected from a group associated with the given cryptographic key protocol.

The secure key for use in the call session between the first party and the second party may be computed at the first party from the first random number and the second random key component. At the second party, the same secure key may be computed from the second random number and the first random key component.

In one embodiment, the multimedia communication system comprises an Internet Protocol Multimedia Subsystem, and a format of one or more of the messages exchanged between the first party and the second party is based on a Multimedia Internet Keying format.

In one or more further embodiments, a method for performing an authenticated key agreement protocol in accordance with a multimedia communication system is extended to provide communication features comprising key forking, retargeting (redirection), deferred delivery, lawful interception, and conference management.

It is to be appreciated that while principles of the invention are particularly suitable to an Internet Protocol Multimedia Subsystem environment, the invention is not intended to be so limited. That is, principles of the invention are generally applicable to any suitable communication system in which it is desirable to provide secure key management features.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1A illustrates a private key acquisition methodology according to an embodiment of the invention;

FIG. 11 illustrates a generalized hardware architecture of a data network and communication (computing) devices suitable for implementing one or more of the protocols according to embodiments of the present invention.

DETAILED DESCRIPTION OF PREFERRED EMBODIMENTS

Figure 1B:
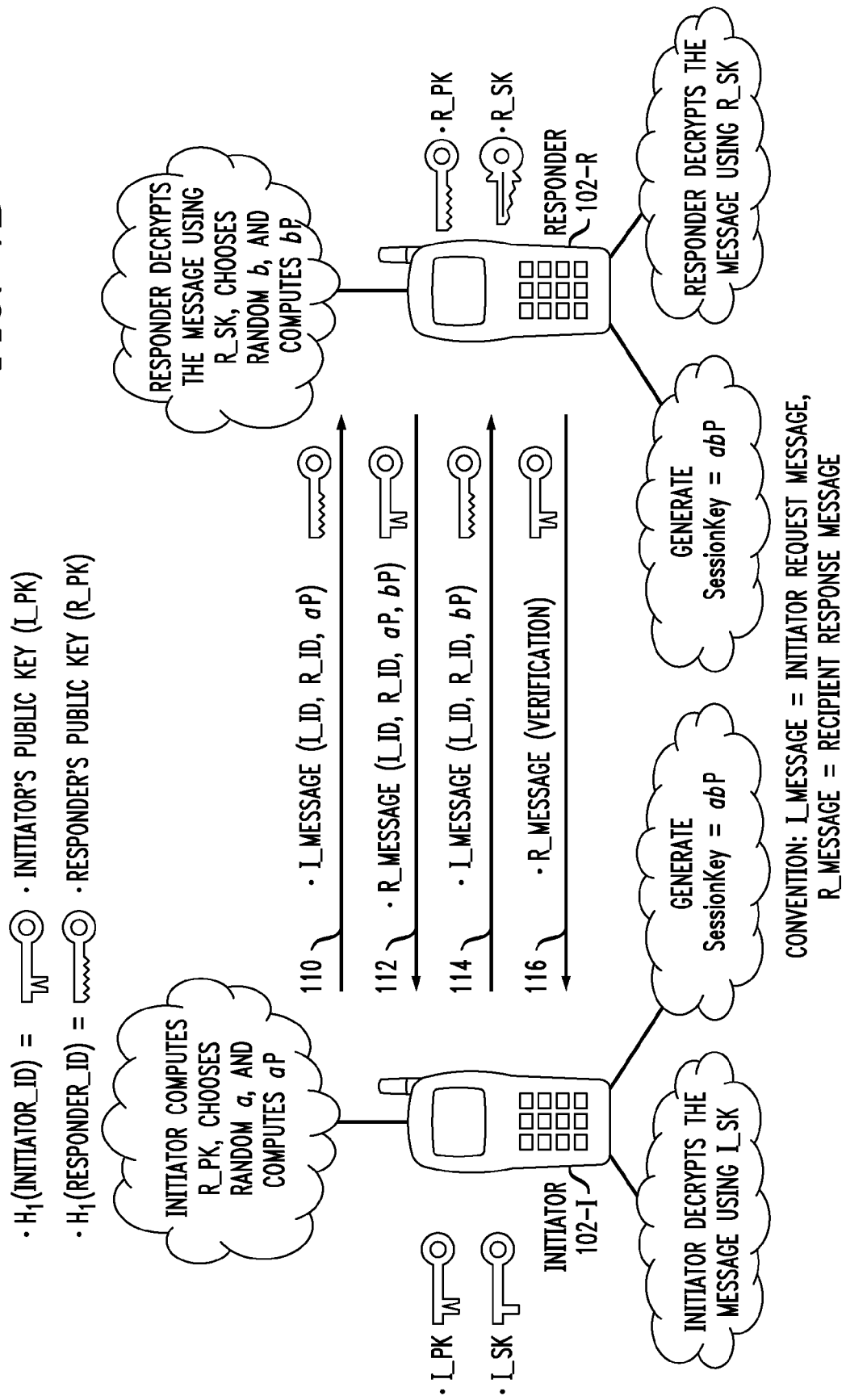
FIG. 1B illustrates an identity based authenticated key exchange methodology according to an embodiment of the invention.

The phrase "multimedia communication system" as used herein is generally defined as any communication system capable of transporting two of more types of media involving, but not limited to, text-based data, graphics-based data, voice-based data and video-based data.

The phrase "media plane" as used herein is generally defined as the functional portion of the multimedia communication system in accordance with which the one or more types of media are exchanged between two or more parties in a call session. This is in contrast with a "control plane" which is the functional portion of the multimedia communication system in accordance with which call negotiation/scheduling is performed in order to establish the call session. Examples of media plane applications with which the inventive techniques can be used include, but are not limited to, Voice-over-IP (VoIP), Instant Messaging (IM), Video/Audio IM, and Video Share. It is understood that the media plane contains application layer traffic.

The term "key" as used herein is generally defined as an input to a cryptographic protocol, for purposes such as, but not limited to, entity authentication, privacy, message integrity, etc.

For ease of reference, the detailed description is divided as follows. Section I describes general principles of identity based encryption and identity based authenticated key exchange operations. Section II describes secure key management solutions according to illustrative principles of the invention in a general communication environment context. Section III describes secure key management solutions according to illustrative principles of the invention in an Internet Protocol (IP) Multimedia Subsystem (IMS) environment context. Section IV describes an illustrative computing system for implementing one or more secure key management protocols according to the invention.

I. Identity Based Encryption (IBE) and Identity Based Authenticated Key Exchange (IBAKE)

Prior to an explanation of illustrative embodiments of secure key management techniques of the invention, general principles of IBE and IBAKE are provided.

A. Identity Based Encryption

An Identity Based Encryption (IBE) protocol was presented by Boneh and Franklin, see Dan Boneh, Matthew K. Franklin, "Identity-Based Encryption from the Weil Pairing" Advances in Cryptology—Proceedings of CRYPTO 2001 (2001), the disclosure of which is incorporated by reference herein. This asymmetric cryptographic encryption protocol allows participants to use an 'identity' (example: email-id, or domain name) as the public key and eliminates the need for large scale public key infrastructure which is often associated with public key encryption methods such as RSA (Rivest, Shamir and Adleman). Boneh and Franklin's approach to the problem uses bilinear maps on an elliptic curve over a finite field, and relies on the bilinear decisional Diffie-Hellman problem.

IBE involves the following mathematical tools and parameters:

Let E be an elliptic curve over a finite field F, and let P be a point of large prime order.

Let e: E×E-→G be a bi-linear map on E. The typical example is the Weil pairing, and hence G will be the group of n-th roots of unity where n is a function of the number of points on E over F.

Let s be a non-zero positive integer and be a secret stored in a Key Generation Function (KGF). This is a system-wide secret and not revealed outside the KGF.

Let $P_{pub}$=sP be the public key of the system that is known to all participants. Recall sP denotes a point in E, since E is a group.

Let $H_1$ be a known hash function that takes a string and assigns it to a point on the elliptic curve, i.e., $H_1(A)=Q_A$ on E, where A is usually the identity, and is also the public key of A.

Let $d_A=sQ_A$ be the private key computed by the KGF and delivered only to A.

Let $H_2$ be a known hash function that takes an element of G and assigns it to a string.

Let m be a message that has to be encrypted and sent to A. The encryption function described by Boneh and Franklin is as follows:

Let $g_A=e(Q_A, P_{pub})$, and let r be a random number.

Encryption$_A$(m)=(rP, m xor $H_2(g_A^r)$); in other words the encryption output of m has two coordinates u and v where u=rP and v=m xor $H_2(g_A^r)$. Note that "xor" refers to the exclusive OR logic function.

In order to decrypt (u,v), A recovers m using the following formula:

$$m = v \text{ xor } H_2(e(d_A, u)).$$

The proof of the formula is a straight forward exercise in bilinear maps, and the fact A has the secret $d_A$ (private key known only to A but not other participants). Also observe that the KGF, which computed $d_A$ in the first place, can also decrypt the message resulting in the KGF being a de-facto key escrow server.

B. Identity Based Authenticated Key Exchange

Identity Based Authenticated Key Exchange (IBAKE) is described in the U.S. patent application identified by Ser. No. 12/372,242, filed on Feb. 17, 2009, the disclosure of which is incorporated by reference herein. The IBAKE protocol allows devices to mutually authenticate each other, and derive a key that provides perfect forwards and backwards secrecy.

In the IBAKE embodiment described here, the basic set up for this protocol involves the mathematical constructs and parameters discussed above in subsection A. Recall that this protocol is asymmetric but does not require any PKI support; instead the protocol employs an offline server which serves as a Key Generation Function. The details of the protocol are outlined below:

Suppose A, B are the two entities (or parties, where A represents a computer system of a first party and B represents a computer system of a second party) that are attempting to authenticate and agree on a key.

We will use A and B to represent their corresponding identities, which by definition also represent their public keys.

Let $H_1(A)=Q_A$ and $H_1(B)=Q_B$ be the respective points on the elliptic curve corresponding to the public keys. In effect, one could refer to $Q_A$ and $Q_B$ as the public keys as well, since there is a one-to-one correspondence between the identities and the points on the curve obtained by applying $H_1$.

Let x be a random number chosen by A, and let y be a random number chosen by B.

The protocol exchanges between A and B comprises of the following steps:

A computes xP (i.e., P added to itself x times as a point on E, using the addition law on E) encrypts it using B's public key, and transmits it to B in a first step. In this step, encryption refers to identity based encryption described in subsection A above.

Upon receipt of the encrypted message, B decrypts the message and obtains xP. Subsequently B computes yP, and encrypts the pair {xP, yP} using A's public key and then transmits it to A in a second step.

Upon receipt of this message, A decrypts the message and obtains yP. Subsequently, A encrypts yP using B's public key and sends it back to B in a third step.

Following this, both A and B compute xyP as the session key.

Observe that A chose x randomly, and received yP in the second step of the protocol exchange. This allows A to compute xyP by adding yP to itself x times. Conversely, B chose y randomly, and received xP in the first step of the protocol exchange. This allows B to compute xyP by adding xP to itself y times. Note that any application of the protocol may utilize header data with the identities to ensure proper functioning of the protocol. This is relatively standard and applicable to almost any protocol exchange for key agreement.

Note also that x is random but xP provides no information about x. Therefore, xP is a component of a key based on a random secret chosen by A. Likewise, y is random but yP provides no information about y. Hence, yP is a component of a key based on a random secret known only to B.

Note further that xyP can serve as a session key. Also, the session key could be any known function of xyP. That is, the session key could equal f(xyP), where f is known to both parties and is not required to be secret (i.e., known to the world). One practical requirement on f should be that f is hard to compute without knowledge of x or y, and the output is of a satisfactory length from a cryptographic perspective, e.g., around 128 bits or more.

Some of the properties of the IBAKE protocol include:

Immunity from key escrow: Observe that all the steps in the protocol exchange are encrypted using IBE. So clearly the KGF can decrypt all the exchanges. However, the KGF can not compute the session key. This is because of the hardness of the elliptic curve Diffie-Hellman problem. In other words, given xP and yP, it is computationally hard to compute xyP.

Mutually Authenticated Key Agreement: Observe that all the steps in the protocol exchange are encrypted using IBE. In particular, only B can decrypt the contents of the message sent by A in the first and third steps, and similarly only A can decrypt the contents of the message sent by B in the second step. Moreover, at the end of the second step, A can verify B's authenticity since xP could have been sent in the second step only after decryption of the contents in the first step by B. Similarly, at the end of the third step, B can verify A's authenticity since yP could have been sent back in the third step only after correctly decrypting the contents of the second step and this is possible only by A. Finally, both A and B can agree on the same session key. In other words, the protocol is a mutually authenticated key agreement protocol based on IBE. While the above description provides the motivation for the security of the protocol, a cryptographic proof of security can be easily provided. The hardness of the protocol relies on the hardness of the Elliptic curve Diffie-Hellman problem, which is influenced by the choice of elliptic curve.

Perfect forward and backwards secrecy: Since x and y are random, xyP is always fresh and unrelated to any past or future sessions between A and B.

No passwords: the IBAKE protocol does not require any offline exchange of passwords or secret keys between A and B. In fact, the method is clearly applicable to any two parties communicating for the first time through any communication network. The only requirement is to ensure that both A and B are aware of each other's public keys, for example, through a directory service.

II. Secure Key Management and Illustrative Extensions

It has been realized that the Internet has rapidly evolved from a best effort data network into a multi-service IP (Internet Protocol) network with support for various classes of traffic including multimedia. This coupled with the rapid growth of mobile wireless networks, has created technology challenges. From the technology perspective, a central challenge that has been addressed reasonably well is the separation of call control functions, consisting of signaling to setup calls, from application layer traffic often referred to as the "media plane." Call control protocols such as H323 (see, e.g., International Telecommunications Union Standardization Section (ITU-T) Recommendation H.323, the disclosure of which is incorporated by reference herein), Session Initiation Protocol or SIP (see, e.g., Internet Engineering Task Force IETF RFC 3261, the disclosure of which is incorporated by reference herein), and IMS (see, e.g., 3GPP Technical Specifications TS 23.218, TS 23.228, TS 24.228, TS 24.229, and TS 24.930, the disclosures of which are incorporated by reference herein) have been standardized by various organizations such as IETF and 3GPP and are in various stages of adoption across fixed and mobile networks.

Simultaneously, elaborate mechanisms to secure signaling at various levels have been incorporated. However, in the media plane, while protocols such as Transport Layer Security or TLS (see, e.g., IETF RFC 2246, the disclosure is incorporated by reference herein), Secure Real-time Transport Protocol or SRTP (see, e.g., IETF RFC 3711, the disclosure is incorporated by reference herein), and Secure Multi-Purpose Internet Mail Extensions or SMIME (see, e.g., IETF RFC 2633, the disclosure is incorporated by reference herein) provide container formats for various applications, the security solutions in the media plane lack coherent and standardized methods to support end-to-end secure key management in the application layer.

Principles of the invention primarily address this issue. In particular, principles of the invention provide a scalable application and protocol agnostic secure key management framework for the media plane. In an illustrative framework, the inventive solutions utilize the asymmetric (hence public key) Identity Based Authenticated Key Exchange (IBAKE) protocol described above in section I.B. Illustrative embodiments describe key exchange mechanisms to support various features such as, for example, secure two party media plane communications, secure multi-party conferencing, secure call forking, secure call re-direct, and secure deferred delivery applications. In addition to providing a scalable framework for secure key management, some exemplary aspects of the design and framework include:

The use of offline key management servers (KMS) that dramatically reduce the complexity of network support required. Recall that asymmetric protocols in a public key setting require elaborate always on Public Key Infrastructure (PKI) support for certificate management including revocation. Symmetric key based Key Management Servers are by definition "always on" servers, with constant synching and updates. By eliminating the "always on" requirement, our framework dramatically reduces costs and abets scalability.

The elimination of any passive key escrow that is inherent in identity based protocols. Recall that symmetric key protocols with a Key Management Server can not eliminate this problem. Also, recall that existing Identity Based Encryption (described above in section I.A.) protocols suffer from key escrow problems; a problem that is solved using IBAKE (described above in section I.B.).

The protocol framework inherently supports mutual authentication of entities involved in the key exchange, coupled with perfect secrecy.

Illustrative embodiments of the invention re-use existing network element architectures, and as much as possible, re-use existing protocol container formats. As an example, in conferencing applications, illustrative embodiments re-use the conference server to enable conferencing but ensure that the conference server does not learn the group key used for communication (unless it is also a party to the conference as will be explained below).

While principles of the invention eliminate passive key escrow, the inventive protocols also provide seamless support for discovering keys when there is a legal requirement for law enforcement to intercept calls.

In illustrative embodiments based on an identity based asymmetric cryptographic framework, each participant has a public key and a private key. The public key is identity based. The private key corresponds to the public key and is issued by a key management server or service (KMS). Participants can obtain private keys from the KMS offline. By way of example only, participants contact their KMS once a month (more generally, for the length of a subscription) to obtain private keys. Private keys may also be obtained as a function of frequency of use. A security association is assumed to exist between the KMS and the participant. Encryption and decryption of messages during the key exchange are based on IBE. Note that public parameters of the KMS are assumed to be publicly available (e.g., online on a website).

In general, a secure key management methodology according to an illustrative embodiment of the invention comprises two main stages. In a first stage, participants (parties) obtain private keys from a key service such as a KMS. In the second stage, an identity based authenticated key exchange is performed between two or more parties seeking to communicate in a multimedia based call session. Messages exchanged between the two or more parties are encrypted based on respective identities of recipients of the messages. Also, the encrypted messages exchanged between the parties contain identities associated with parties.

FIG. 1A shows the first stage of the secure key management methodology, i.e., private key acquisition. As shown, communication devices (more generally, computing devices) 102 of two parties each request and obtain private (or secret) keys from a respective KMS 104. The private key exchange 106 is performed according to a secure communication protocol. Examples of secure communications protocol include, but are not limited to, Internet Protocol Security or IPSec (see, e.g., IETF RFC 2406, IETF RFC 2409, IETF RFC 4306, and IETF RFC 4308, the disclosures of which are incorporated by reference herein) and Transport Layer Security or TLS (see, e.g., IETF RFC 2246, the disclosure is incorporated by reference herein). Generalized Bootstrap Architecture or GBA (see, e.g., 3GPP Technical Specification (TS) 33.220, the disclosure of which is incorporated by reference herein) may be used to determine a key to use in the secure communications protocol between each party and the KMS. In one example, one could have an application running in the client device that connects to the KMS server and uses TLS in the application layer (above Transport Control Protocol or TCP, see, e.g., W. Richard Stevens. TCP/IP Illustrated, Volume 1: The Protocols, ISBN 0-201-63346-9; W. Richard Stevens and Gary R. Wright. TCP/IP Illustrated, Volume 2: The Implementation, ISBN 0-201-63354-X; W. Richard Stevens. TCP/IP Illustrated, Volume 3: TCP for Transactions, HTTP, NNTP, and the UNIX Domain Protocols, ISBN 0-201-63495-3, the disclosures of which are incorporated by reference herein) which uses the GBA key or IPSec at the network layer with the GBA key as the pre-shared key.

Note that the device on the left is considered the initiator (I) and the one on the right is the responder (R). This designation comes from the fact that the device on the left seeks to initiate a multimedia call session with the device on the right.

As shown, each device provides an identifier with its request to the KMS to which the KMS responds with a private (secret) key. In the case of the initiator device 102-I, one identifier is provided to the KMS 104-I, and one private key I-SK is provided to the device in response. In the case of the responder device 102-R, two separate identifiers are sent to the KMS 104-R, i.e., R and R1. In response, the KMS provides the responding party with two private keys R_SK and R1_SK. Of course, each party may request and obtain more or less private keys based on some private key acquisition schedule. This may be a time-based schedule (e.g., one month period), a call session frequency-based schedule (e.g., when needed to make a call), and a subscription-based schedule (e.g., the party subscribes to the key service of the KMS for some length of time or based on an occurrence of a subscription ending condition).

Also, it is to be appreciated that a given party may have multiple public identities. For example, party B ("Bob") may have two identities: bob@work.com and bob@home.com. For these two identities, there can be two different public keys and thus two different private keys.

FIG. 1B shows the second stage of the secure key management methodology, i.e., authenticated key exchange. In this embodiment, the authenticated key exchange is based on IBAKE (described above in section I.B.). Since a preferred format of the messages exchange between the first party and the second party is based on a Multimedia Internet Keying (MIKEY) format, the overall secure key exchange protocol of FIGS. 1A and 1B is therefore referred to herein as a MIKEY-IBAKE protocol.

Again, it is assumed that the device on the left is the initiating party or initiator, 102-I, and the device on the right is the responding party or responder, 102-R. The steps of the authenticated key exchange follow steps similar to the IBAKE protocol.

It is assumed that the initiator's public key I_PK is computed by using a hash function as described above in section I. Likewise, the responder's public key R_PK is computed in a similar manner. Recall that the private keys of the initiator and responder are I_SK and R_SK, respectively. That is, let $H_1(Initiator\_ID)=I\_PK$ and $H_1(Responder\_ID)=R\_PK$ be the respective points on the elliptic curve corresponding to the public keys.

Let a be a random number chosen by initiator 102-I, and let b be a random number chosen by responder 102-R.

The protocol exchanges between 102-I and 102-R comprise of the following steps:

Initiator 102-I computes a first random key component aP (i.e., P added to itself a times as a point on E, using the addition law on E), encrypts the first random key component using the responder's public key (R_PK), and transmits it to the responder 102-R in step 110. In this step, encryption refers to identity based encryption described in subsection I.A. above. Note that also included in the encrypted message in step 110 are the identities of the initiator and the responder (I_ID and R_ID, respectively).

Upon receipt of the encrypted message, the responder decrypts the message using its private key (obtained in FIG. 1A) and obtains aP. Subsequently, the responder computes a second random key component bP, and encrypts the pair {aP, bP} using the initiator's public key and then transmits the pair to the initiator in step 112. Again, the encrypted message in step 112 includes the identities of the initiator and the responder (I_ID and R_ID, respectively).

Upon receipt of the message from step 112, the initiator decrypts the message using its private key (obtained in FIG. 1A) and obtains bP. Subsequently, the initiator encrypts bP using the responder's public key and sends it back to the responder in step 114. Again, the encrypted message in step 114 includes the identities of the initiator and the responder (I_ID and R_ID, respectively).

In step 116, the responder sends a verification message to the initiator encrypted using the public key of the initiator.

Following this, both initiator and responder compute abP as the secure call session key to be used for secure communicating with each other during the call session via the media plane (application layer) of the multimedia communication system.

Observe that the initiator 102-I chose a randomly, and received bP in the second step of the protocol exchange. This allows the initiator to compute abP by adding bP to itself a times. Conversely, the responder 102-R chose b randomly, and received aP in the first step of the protocol exchange. This allows the responder to compute abP by adding aP to itself b times. Note also that a is random but aP provides no information about a. Therefore, aP is considered a component of a key based on a random secret chosen by the initiator. Likewise, b is random but bP provides no information about b. Hence, bP is considered a component of a key based on a random secret known only to the responder.

Figure 2:
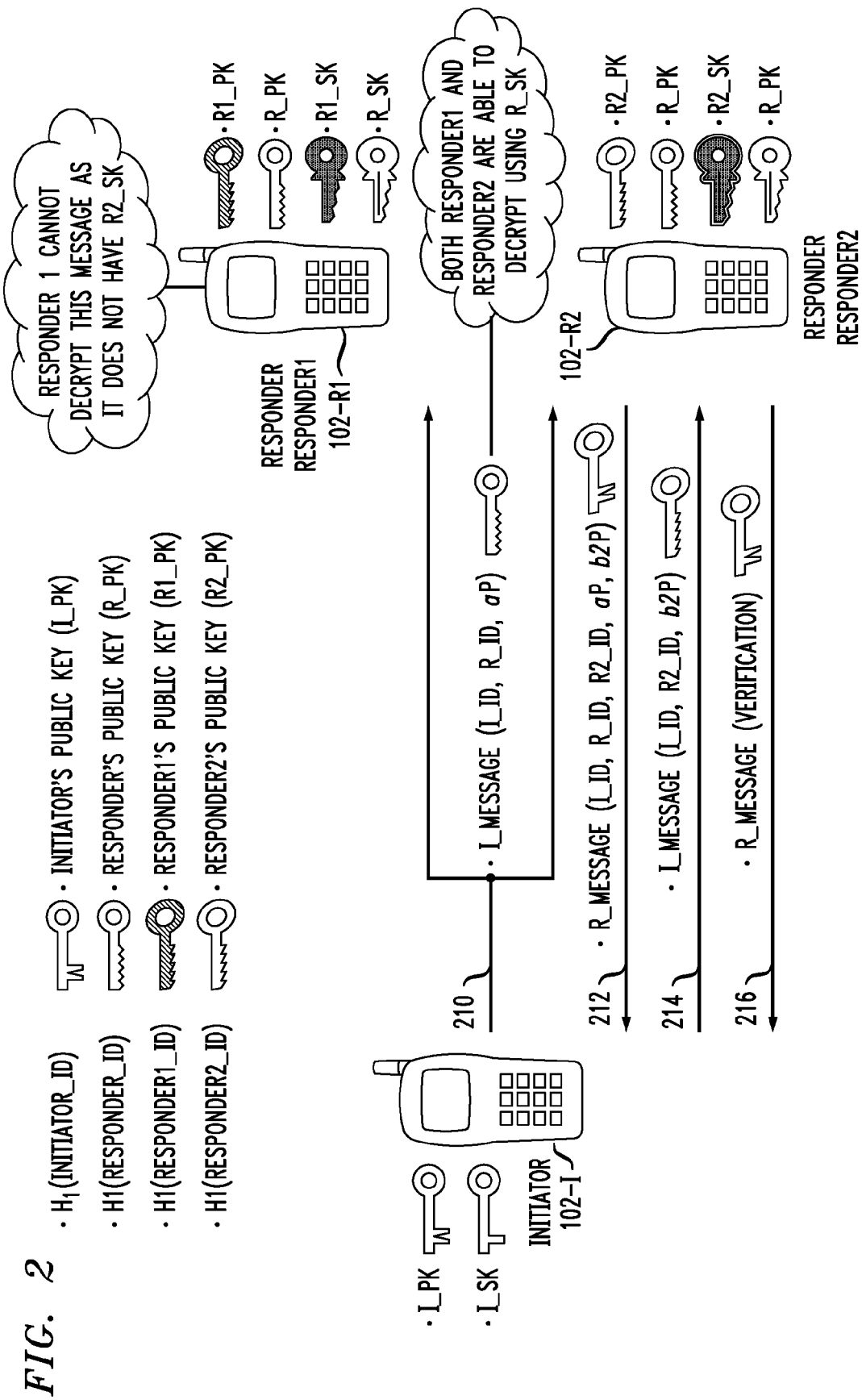
FIG. 2 illustrates a key forking methodology according to an embodiment of the invention.

Referring now to FIG. 2, an extension of the MIKEY-IBAKE protocol is illustrated. It is to be understood that since this is an extension of the MIKEY-IBAKE protocol described above, for the sake of simplicity, not all features of the MIKEY_IBAKE protocol are repeated. In this particular embodiment, FIG. 2 illustrates forking. Forking is the delivery of a request to multiple locations. This may happen, for example, when the responder has more than one communication (computing) device on which he/she can participate in a multimedia call session. One example of forking is when a party has a desk phone, a personal computer (PC) client, and mobile handset, all configured to participate in the MIKEY-IBAKE protocol. In general, forking is a feature of a multimedia session initiation protocol than enables an incoming call to simultaneously ring several extensions. The first telephone to answer will then take control of the call.

Thus, as depicted in FIG. 2, the responding party has two devices 102-R1 and 102-R2 associated therewith. Thus, as shown, device 102-R1 has a public key R1_PK and a secret key R1_SK. Also, device 102-R1 knows the responding party's public and private keys, R_PK and R_SK. Likewise, device 102-R2 has a public key R2_PK and a secret key R2_SK. Also, device 102-R2 knows the responding party's public and private keys, R_PK and R_SK.

The MIKEY-IBAKE protocol steps 210, 212, 214 and 216 in the forking scenario are essentially the same as the MIKEY-IBAKE protocol steps 110, 112, 114 and 116 in the general context of FIG. 1B, with the following exceptions.

Note that because the message sent by device 102-I in step 210 is encrypted with R_PK, both devices R1 and R2 can decrypt the message (since they both have R_SK). However, assuming that the responding party is currently associated with device R2 rather than device R1, then the return message in step 212 includes random key component b2P, computed by R2 in accordance with IBAKE (where b2 is the random number selected by R2). Also, the encrypted messages in step 212 includes the identities of the initiator, responder, and device R2 (I_ID, R_ID and R2_ID, respectively).

Device 102-I decrypts the message received from R2 using its private key to obtain the b2P and the identities included in the message. The initiator thus identifies that the message in step 212 came from R2. In accordance with the MIKEY-IBAKE protocol, the initiator then sends a message in step 214 including b2P, I_ID, and R2_ID. The message is encrypted using the public key of R2. Note that this can not be decrypted by R1 since R1 only has R_SK and R1_SK, but not R2_SK. Step 216 is the verification message similar to step 116 in FIG. 1B. The call session key can then be computed at device 102-I and at device 102-R2 as ab2P.

Figure 3:
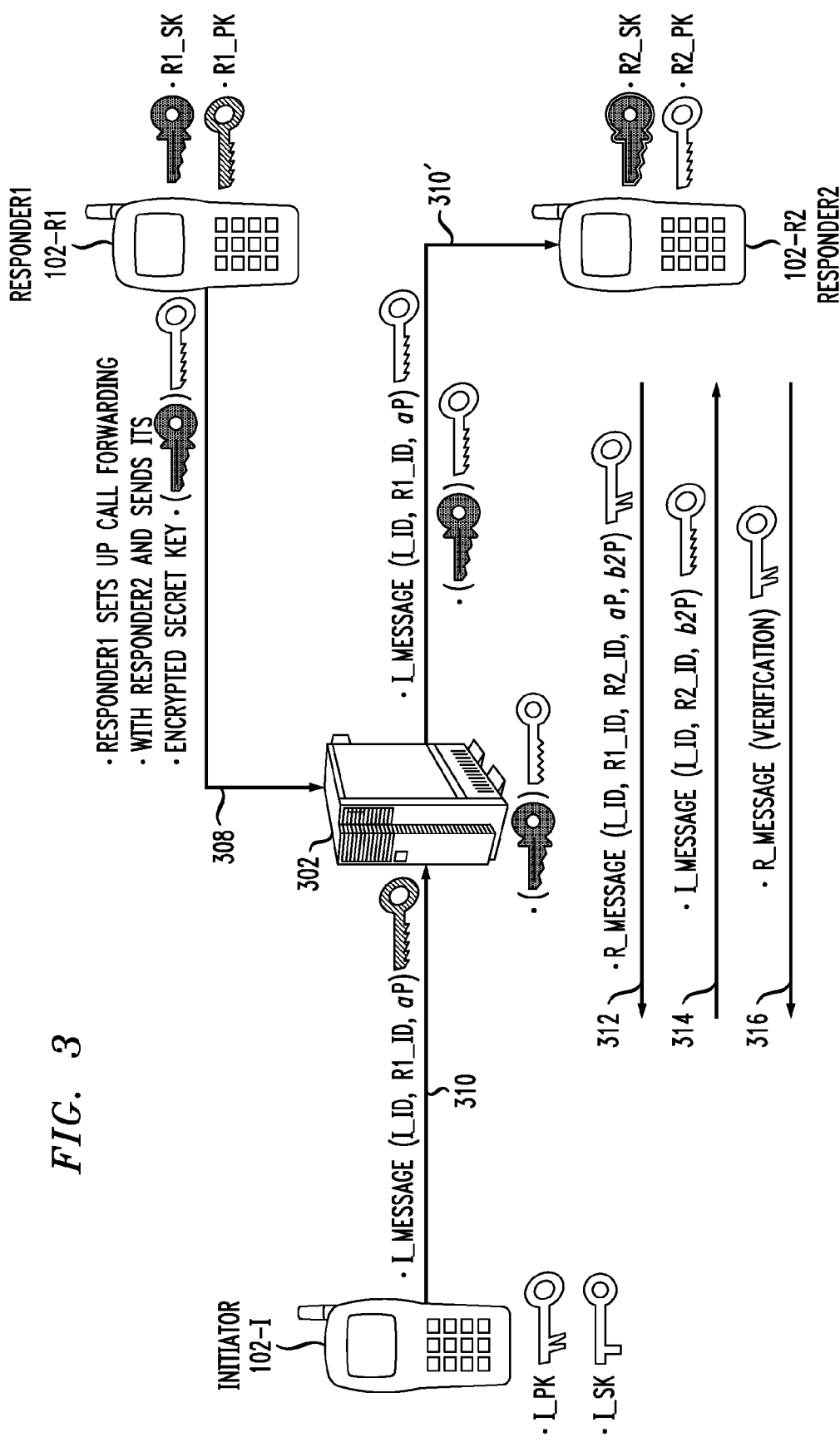
FIG. 3 illustrates a call redirection methodology according to an embodiment of the invention.

FIG. 3 illustrates an extension of the MIKEY-IBAKE protocol to a retargeting feature. It is to be understood that since this is an extension of the MIKEY-IBAKE protocol described above, for the sake of simplicity, not all features of the MIKEY_IBAKE protocol are repeated. Retargeting or redirection is a scenario in which one or more functional elements in the communication system decide to redirect the call to a different destination. This decision to redirect a session may be made for different reasons by a number of different functional elements, and at different points in the establishment of the session. This is also known as call forwarding.

The example of FIG. 3 shows an application server 302 making the redirect determination. The MIKEY-IBAKE protocol steps 310, 312, 314 and 316 in the forking scenario are essentially the same as the MIKEY-IBAKE protocol steps 110, 112, 114 and 116 in the general context of FIG. 1B, with the following exceptions.

Device 102-I sends the first message in the protocol in step 310 with the intention of it going to device 102-R1 (the message encrypted with R1's public key). However, the functional element 302 made a decision that the message in 310 should be redirected to device R2, see step 310'. Prior thereto, or in conjunction therewith, it is assumed that R2 received R1's private key in a message sent in step 308 via the functional element. The message sent from R1 to R2 is encrypted using R2's public key. Thus, functional element 302 can not decrypt the message in 308 but R2 can decrypt the message in 310' and respond to the initiator in step 312. From this point, steps 312, 314 and 316 are identical to steps 212, 214 and 216 in the forking scenario of FIG. 2.

Figure 4A:
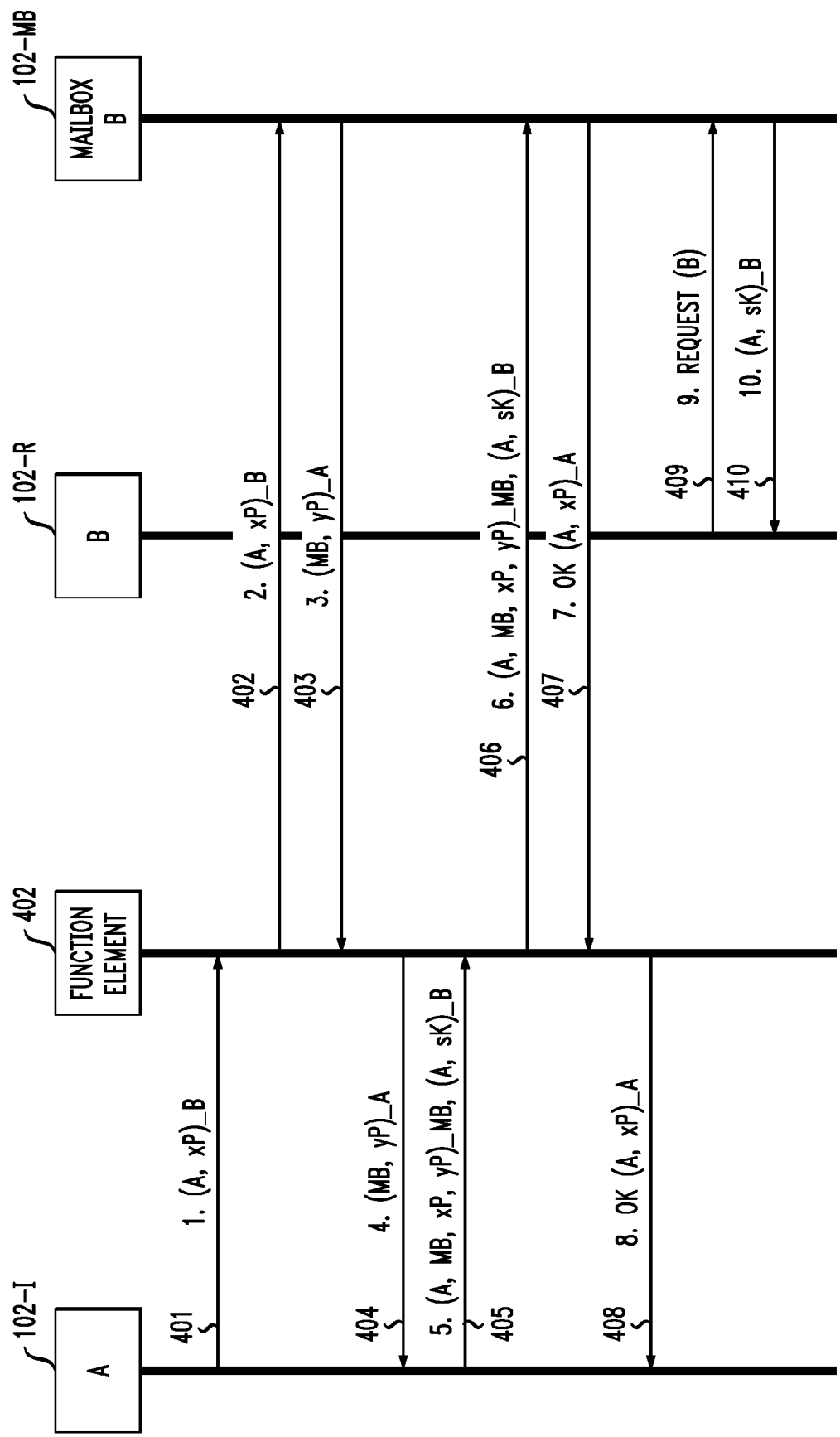
FIG. 4A illustrates a deferred delivery methodology according to an embodiment of the invention.

FIG. 4A shows a deferred delivery extension of the MIKEY-IBAKE protocol. It is to be understood that since this is an extension of the MIKEY-IBAKE protocol described above, for the sake of simplicity, not all features of the MIKEY_IBAKE protocol are repeated. Deferred delivery is type of service such that the session content can not be delivered to the destination at the time that it is being sent (e.g., the destination user is not currently online). Nevertheless, the sender expects the network to deliver the message as soon as the recipient becomes available. One example of deferred delivery is voicemail.

In FIG. 4A, assume A is device 102-I, B is 102-R, device 402 is a functional element such as an application server, and MB is a mailbox 102-MB (more generally, a temporary destination) associated with B.

In step 401, A sends a first message comprising an encrypted first random key component (xP) to B. The first random key component was computed at A, and the first message was encrypted using a public key of B. The functional element 402 determines that B is unavailable, and forwards the first message to MB in step 402.

In step 403, MB sends to A a second message comprising an encrypted second random key component (yP) which was computed by MB. The message in step 403 was encrypted at MB using a public key of A. In step 404, functional element 402 sends the message on to A.

A decrypts the message from MB using the private key obtained by A from the key service to obtain the second random key component. A identifies that the message received in step 404 came from MB (due to MB's identity being included in the message).

In step 405, A sends a third message (via the functional element in step 406) to MB including an encrypted random key component pair, the random key component pair having been formed from the first random key component (xP) and a second random key component (yP) and encrypted at A using the public key of MB. This third message also includes an encrypted random secret key (sK) computed at A and encrypted at A using the public key of B. MB acknowledges receipt to A via steps 407 and 408. MB can not decrypt that latter part of the message (since it is encrypted using B's public key and MB does not have B's private key), and thus can not learn sK.

MB provides the encrypted random secret key (sK) to B upon request by B, after a mutual authentication operation between B and MB. This is shown in steps 409 and 410. This secret key is then used by B to obtain the content (e.g., voice message) left by A in B's mailbox.

Figure 4B:
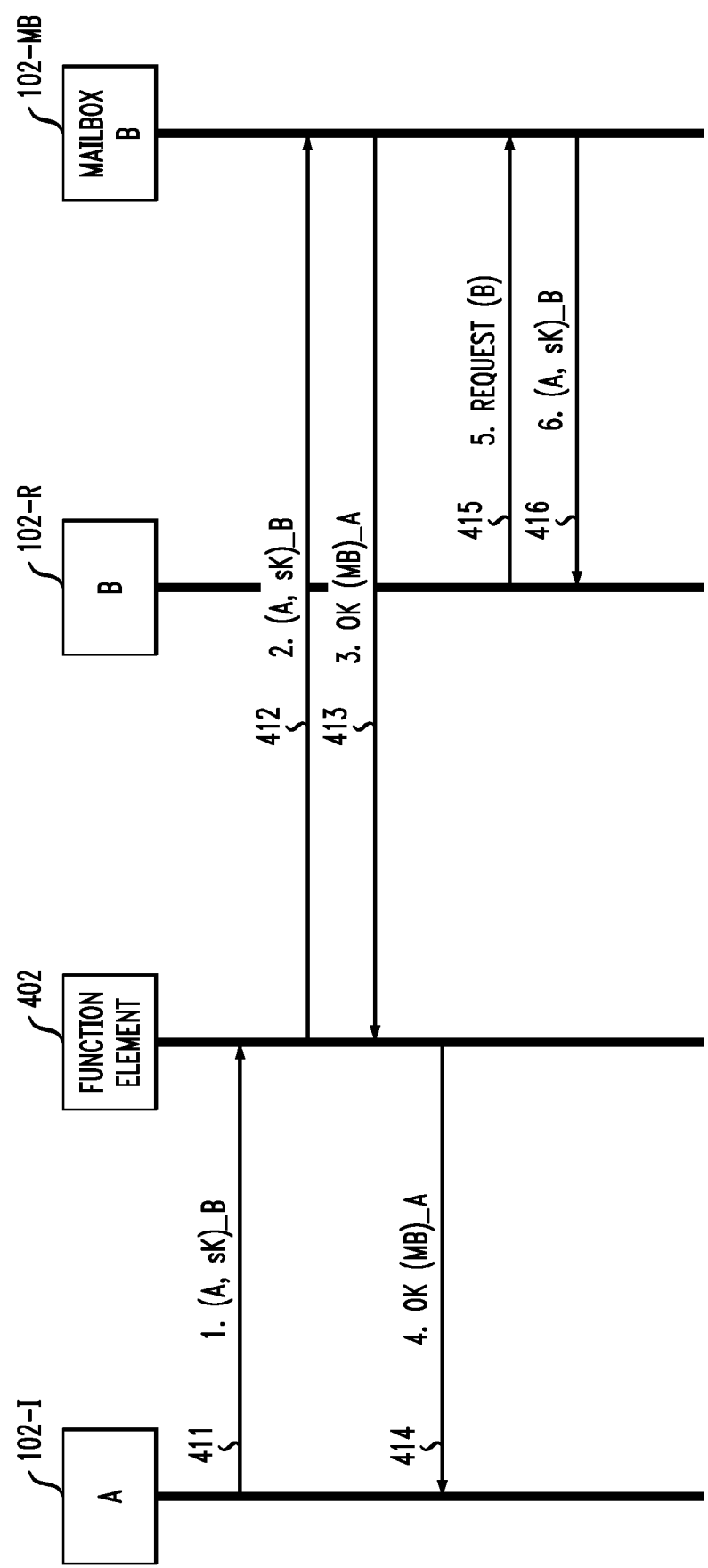
FIG. 4B illustrates a deferred delivery methodology according to another embodiment of the invention.

In a variation to the deferred delivery of FIG. 4A, depicted in FIG. 4B, assume that an authenticated key agreement protocol is not performed but rather, in the first message, A sends an encrypted random secret key (sK) computed at A and encrypted at A using a public key of B (step 411). The functional element 402, having determined that B is unavailable, forwards the first message to MB (step 412), which confirms it (steps 413 and 414). Later, B can retrieve the secret key from MB in the same manner as described above (steps 415 and 416).

Figure 5:
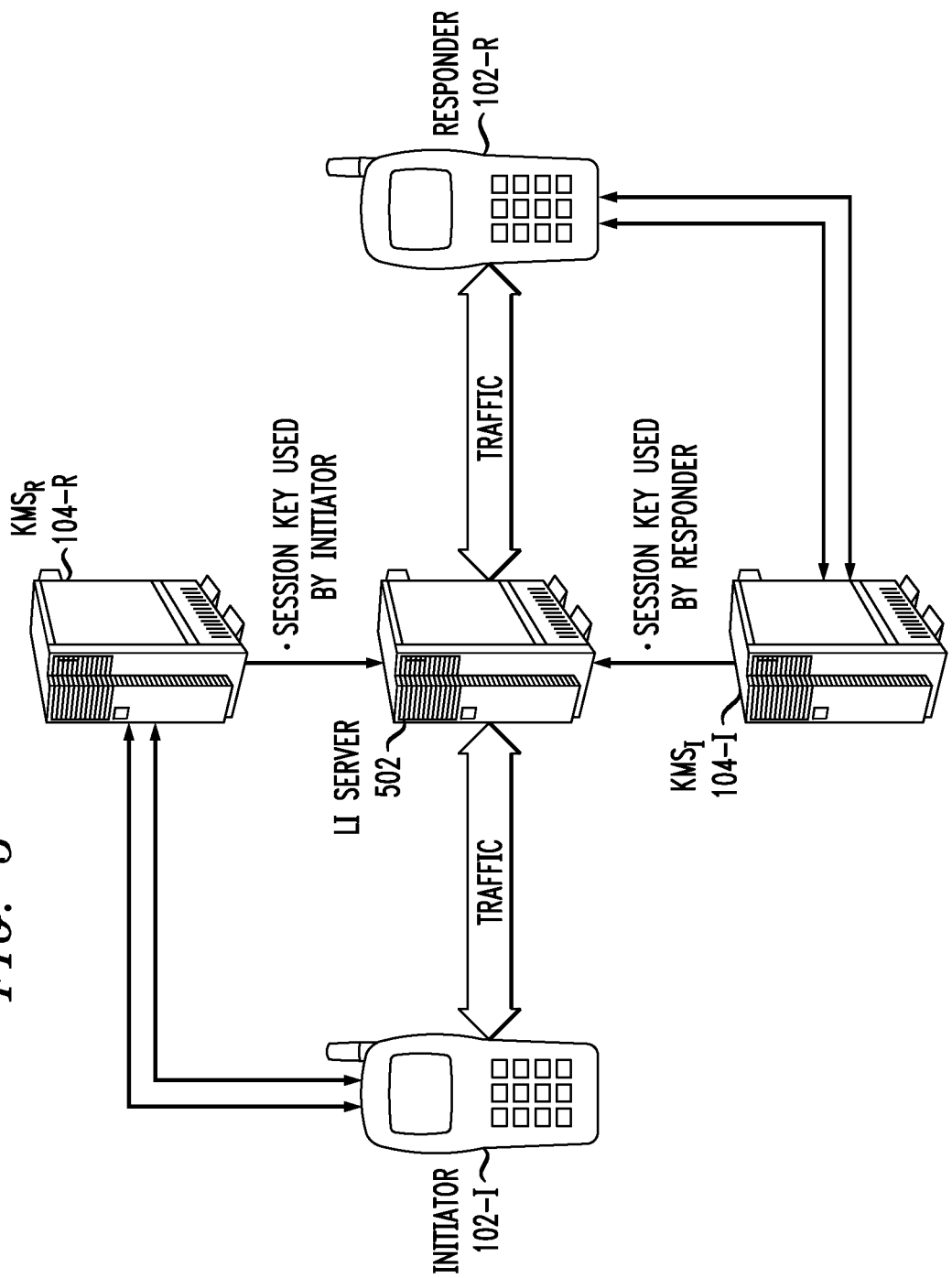
FIG. 5 illustrates a lawful intercept methodology according to an embodiment of the invention.

FIG. 5 shows yet another extension of the MIKEY-IBAKE protocol. Again, it is to be understood that since this is an extension of the MIKEY-IBAKE protocol described above, for the sake of simplicity, not all features of the MIKEY_MAKE protocol are repeated. The extension in FIG. 5 relates to the concept of lawful interception of messages exchanged in the multimedia communication system. The concept of lawful intercept is based on a situation when a law enforcement authority needs to be able to "listen in" on communications of one or more parties.

In one approach, the law enforcement authority can simply obtain the private keys of 102-I and 102-R through a search warrant, and play active "man-in-the-middle" during the key agreement protocol and then tap into the traffic.

In another approach, shown in FIG. 5, a law enforcement server (LI server) 502 functions with the initiator's KMS ($KMS_I$) and the responder's KMS ($KMS_R$) to lawfully intercept messages sent between device 102-I and device 102-R. While FIG. 5 shows separate servers for the LI server, $KMS_I$, and $KMS_R$, it is to be appreciated that one functional element (e.g., an intercept server) in the multimedia communication system may be used to perform KMS and intercept functions.

Accordingly, the MIKEY_MAKE protocol as described above in the context of FIGS. 1A and 1B is performed. However, the LI server imitates the initiator for messages sent to the responder, and imitates the responder for messages sent to the initiator.

For example, consider the message flow when the LI server imitates the responder. Assume 102-I sends a first message including an encrypted first random key component for intended receipt by 102-R. The first message is intercepted by the LI server. The LI server then computes a second random key component and sends a second message including an encrypted random key component pair to 102-I. The random key component pair is formed from the first random key component and the second random key component computed at the LI server. The second message is encrypted at the LI server using the public key of 102-I.

The second message is decrypted using the private key obtained by 102-I from the key service to obtain the second random key component. Device 102-I then sends a third message including the second random key component for intended receipt by 102-R, but which is intercepted by the LI server. Thus, the LI server is able to compute the same secure key that device 102-I computes.

It is to be understood that the LI server also imitates the initiator (102-I) in sending and receiving messages during the authenticated key agreement operation such that the responder (102-R) establishes a secure key with the LI server that the responder believes was agreed upon by the initiator (but, in fact, was agreed upon with the LI server).

It is to be appreciated that one or more of the MIKEY-IBAKE protocol features described above can be extended to a conferencing system scenario. Such an extension is depicted in FIGS. 6A through 6C.

The general assumption is that the conference server (more generally, the conference management element) relaying multiparty communication (e.g., a conference bridge) does not know the group key, while all the users have access to the same group key. There is an exception to this assumption, i.e., in peer-to-peer conferencing, when the computing device serving as the conference bridge is also a party substantively participating in the conference.

Figure 6A:
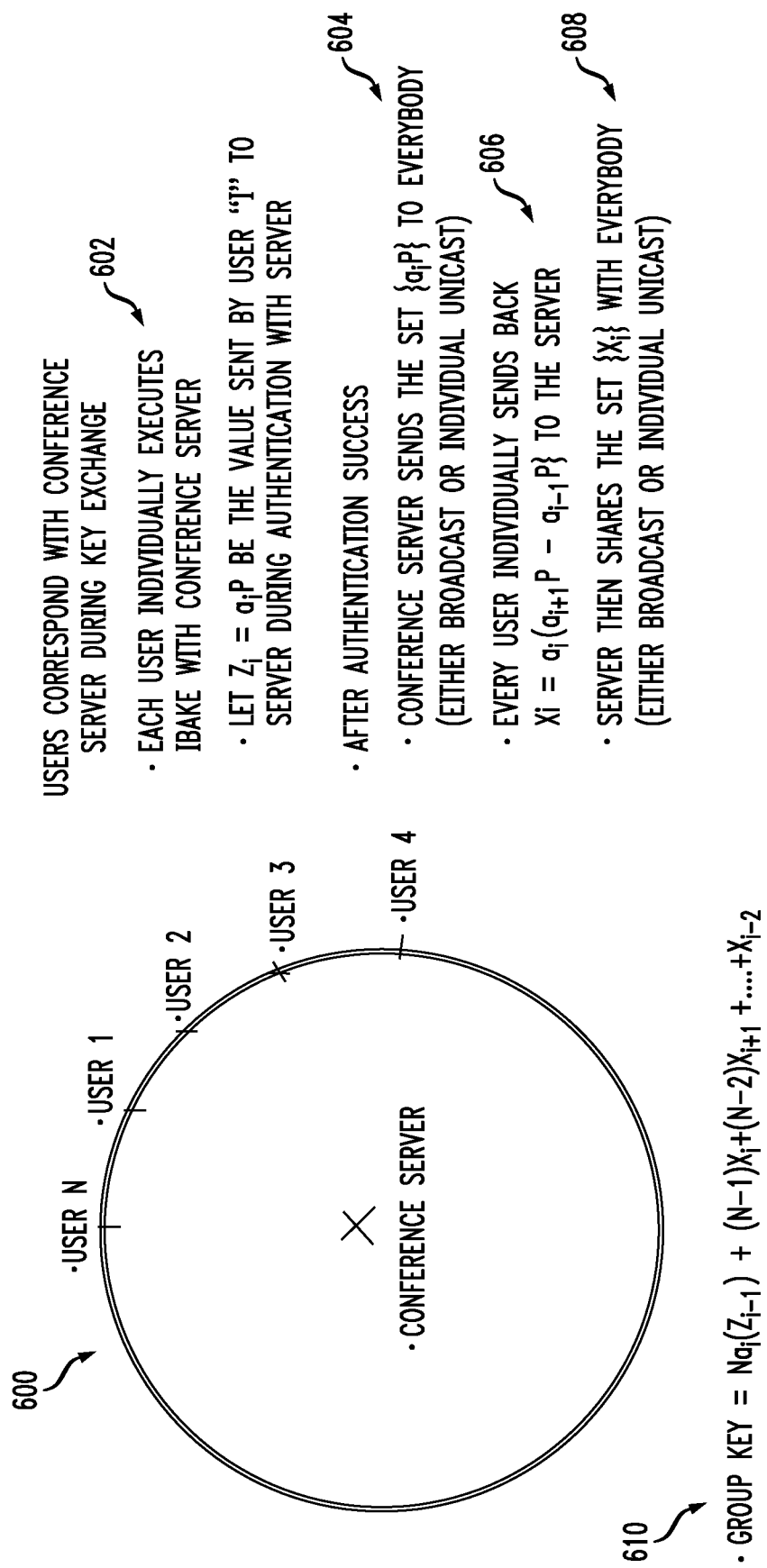
FIG. 6A illustrates a conferencing management methodology according to an embodiment of the invention.
Figure 6B:
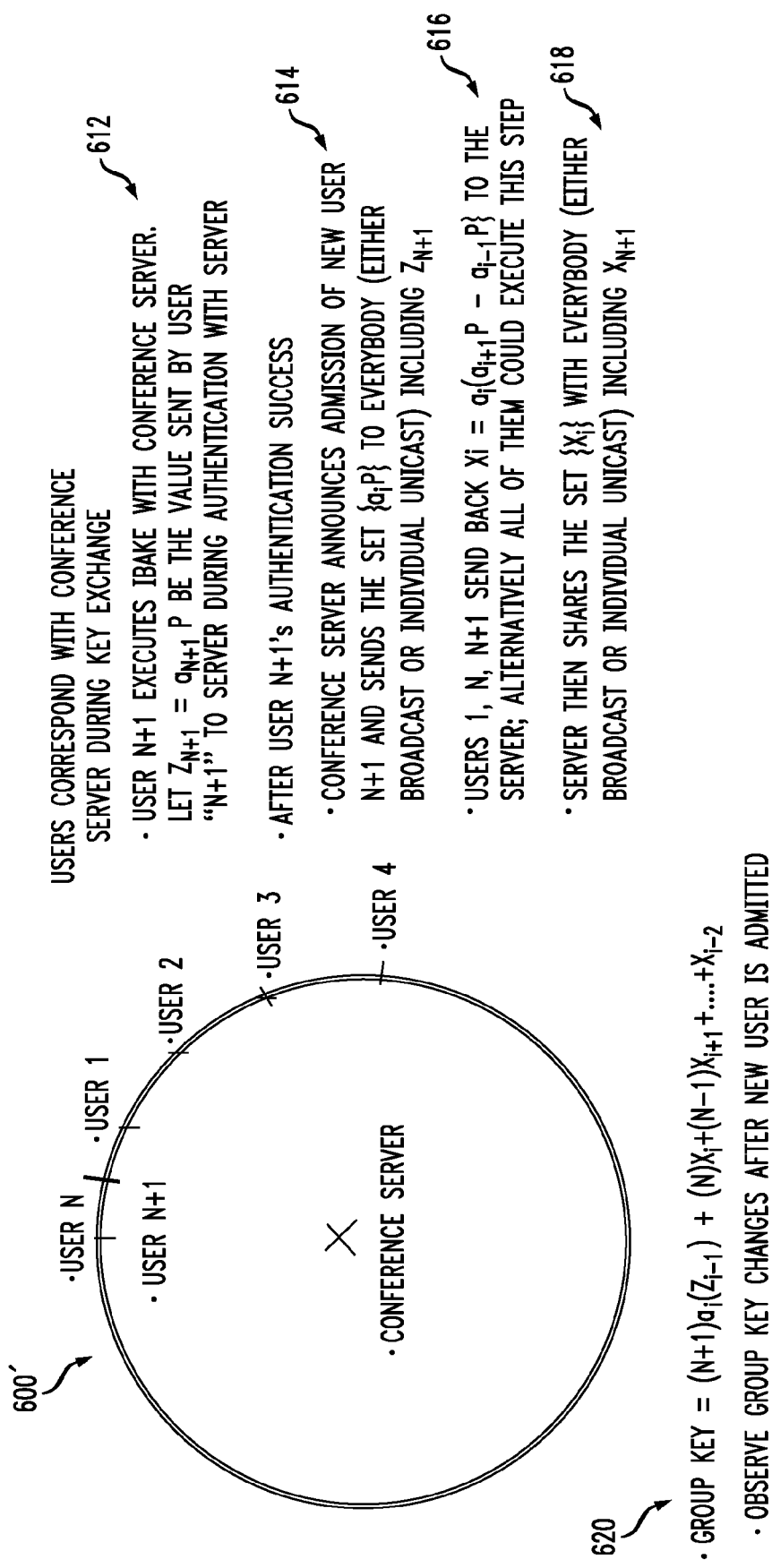
FIG. 6B illustrates addition of a participant in a conferencing management methodology according to an embodiment of the invention.
Figure 6C:
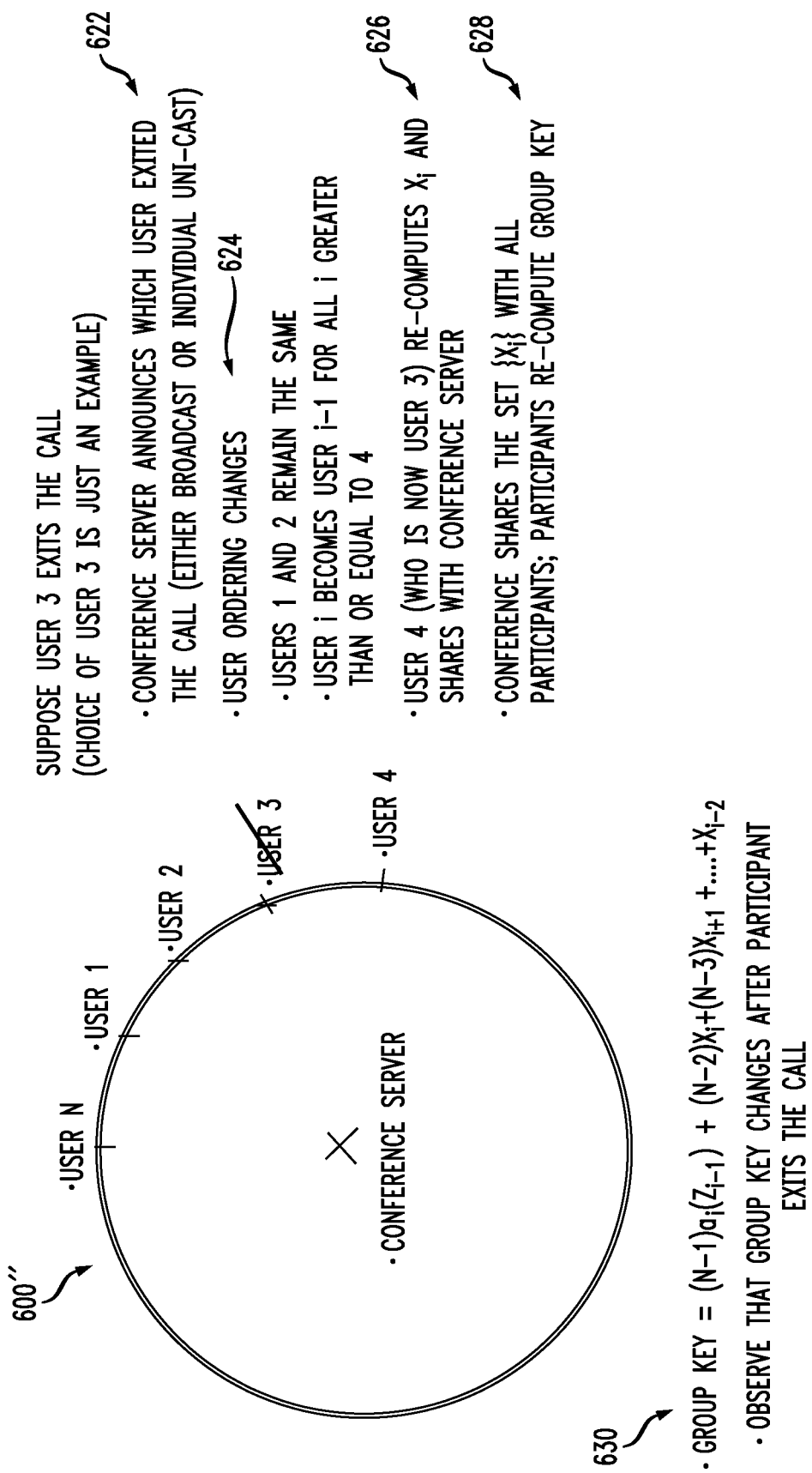
FIG. 6C illustrates deletion of a participant in a conferencing management methodology according to an embodiment of the invention.

As shown in FIG. 6A, a multiparty conference 600 is assumed including a conference server and users (parties) 1 through N, where the user number is assigned in the order that the user seeks to join the conference, i.e., sequentially 1, 2, 3, ... N.

In step 602, each user individually executes the IBAKE protocol with the conference server. Let $Z_i=a_iP$ be the value sent by user "I" to the conference server during authentication with server. Recall that $a_iP$ is the random key component computed by the party in accordance with IBAKE.

After authentication success, in step 604, the conference server sends the set $\{a_iP\}$ to every user (either broadcast or individual unicast). Set $\{a_iP\}$ is thus a set which includes the random key components computed by each of the parties.

In step 606, every user individually sends back $Xi=a_i\{a_{i+1}P-a_{i-1}P\}$ to the conference server. Note that $a_i\{a_{i+1}P-a_{i-1}P\}$ is a random group key component, wherein the random group key component is computed by each party via a computation based on the random number used by the party during the key authentication operation and the random key components computed by a subset of others of the two or more parties seeking to participate in the conference. In this embodiment, the random group key component for a given party $a_i\{a_{i+1}P-a_{i-1}P\}$ is computed such that $a_i$ is the random number selected by the given party, $a_{i+1}P$ is the random key component sent to the server by the party immediately following the given party in the conference ordering, $a_{i-1}P$ is the random key component sent by the party immediately preceding the given party in the conference ordering, and P is a point selected from a group associated with the identity encryption-based key authentication operation (e.g., point selected from an elliptic curve as described above).

In step 608, the conference server then shares the set $\{X_i\}$ with everybody (either broadcast or individual unicast). That is, set $\{X_i\}$ is a set including the random group key components computed by the parties.

In step 610, each party can compute the same group key for use in communicating with each other party through the conference server. The group key is computed as follows $Na_i(Z_{i-1})+(N-1)X_i+(N-2)X_{i+1}+ \ldots +X_{i-2}$, where N represents the total number of parties seeking to participate in the conference, $a_i$ represents the random number selected by the given party, $Z_i$ represents the random key component computed by the given party, $X_i$ represents the random group key component computed by the given party, and i represents a number of a conference ordering for the given party in the N-party conference with i−1=N when i=1 and i+1=1 when i=N.

As mentioned above, the conference server is not a participating party in the conference and thereby is unable to compute the group key. However, in a peer-to-peer scenario, the conference server is a participating party in the conference call and thereby needs to be able to compute the group key.

It is understood that the conference server performs a mutual authentication operation with each party seeking to participate in the conference. The conference server also only admits a given party to the conference when at least two conditions are met: (i) the given party is authenticated by the conference management element; and (ii) the given party is confirmed to belong to a conference authorization list. Also, in accordance with the above MIKEY-IBAKE protocol, the parties seeking to participate in the conference, and the conference server, obtain respective private keys from one or more key management services (KMS).

FIG. 6B illustrates how a new conference participant (user N+1) is added to an ongoing conference, thus resulting in modified conference 600'.

In step 612, user N+1 executes IBAKE with the conference server. Let $Z_{N+1}=a_{N+1}P$ be the value sent by user "N+1" to server during authentication with server. After user N+1's authentication success, in step 614, the conference server announces admission of new user N+1 and sends the set $\{a_iP\}$ to everybody (either broadcast or individual unicast) including $Z_{N+1}$.

In step 616, users 1, N, N+1 send back $Xi=a_i(a_{i+1}P-a_{i-1}P)$ to the server; alternatively all of them could execute this step. In step 618, the conference server then shares the set $\{X_i\}$ with everybody (either broadcast or individual unicast) including $X_{N+1}$. The group key $(N+1)a_i(Z_{i-1})+(N)X_i+(N-1)X_{i+1}+ \ldots +X_{i-2}$ is then recomputed in step 620. Observe that the group key changes after the new user is admitted.

FIG. 6C illustrates how a conference participant exits an ongoing conference, thus resulting in modified conference 600".

Assume that user 3 exits the call (it is to be understood that choice of user 3 is just an example). In step 622, the conference server announces which user exited the call (either broadcast or individual unicast). User ordering changes in step 624. Users 1 and 2 remain the same. User i becomes user i−1 for all i greater than or equal to 4. In step 626, user 4 (who is now user 3) re-computes $X_i$ and shares this contribution with the conference server. In step 628, the conference shares the set $\{X_i\}$ with all participants. In step 630, the participants recompute group key $(N-1)a_i(Z_{i-1})+(N-2)X_i+(N-3)X_{i+1}+ \ldots +X_{i-2}$. Again, observe that the group key changes after a participant exits the call.

Principles of the invention also provide an extension to the conferencing management techniques described above. The extension involves lawful interception of conference messages.

Suppose there are N participants in the conferencing system. Assume that participant N is "tainted" and law enforcement authorities have obtained a warrant to tap into calls to and from participant N. The choice of declaring participant N as tainted is just for illustration and makes the description easier to follow, and the solution is in no way limiting to declaring the N-th user as the tainted user.

Prior to the conference call, the LI server (recall in FIG. 5) approaches the KMS corresponding to participant N and obtains the private key of participant N. This will allow the LI server to pretend to be participant N during the group key exchange process and execute all the steps in FIG. 6A except participant N's contributions are replaced with contributions from the LI server. In particular, the LI server will substitute $Z_{LI}$ and $X_{LI}$ in place of $Z_N$ and $X_N$. The rest of the participants will not know the difference, and will compute a group key, call it GK'.

Next, the LI server works with the conference server, and replaces $Z_1$ and $X_1$ with $Z_{LI}$ and $X_{LI}$ in all communications with participant N. This will imply participant N will compute a group key different from GK'. Call this new key GK".

Note that in the step above, the LI server could have replaced $Z_i$ and $X_i$ with $Z_{LI}$ and $X_{LI}$ for any participant, and the choice of i=1 is only for illustration.

After the call is set up, any communication from participants 1 through N−1 will be encrypted using GK'. Since the LI server knows GK', it can then intercept the communication, decrypt it, following which it will re-encrypt it with GK" and send it to participant N. Conversely, any communication from participant N will be encrypted using GK" which will be intercepted by the LI server, then decrypted using GK", re-encrypted using GK', and sent through to participants 1 through N−1.

III. IMS Embodiments

In the following section, the above general principles of MIKEY_IBAKE and its extensions are applied to an IP Multimedia Subsystem (IMS) environment. That is, the multimedia communication system in this section is considered to be an IMS network. IMS standards are described, for example, in 3GPP Technical Specifications TS 23.218, TS 23.228, TS 24.228, TS 24.229, and TS 24.930, the disclosures of which are incorporated by reference herein We first describe an architectural framework for IMS media plane security, specifically key management, based on which various features and use cases can be derived.

At the core of the solution, is the identity-based encryption (IBE) concept, similar to RFC 5091, RFC 5408 and RFC 5409, the disclosures of which are incorporated by reference herein.

However, these RFCs do not provide authentication and suffer from an inherent key escrow problem. We address these problems, by extending basic IBE to include the Identity Based Authenticated Key Exchange (IBAKE) protocol that provides mutual authentication, eliminates passive key escrow, and provides perfect secrecy of keys. While IBAKE is the basic protocol construct, we use MIKEY as the protocol container for key delivery.

One key idea about the inventive IMS solution framework is that, we re-use the proposed architecture including a KMS, but notably we do not require these KMS servers to be always on-line. In other words, in the proposed framework, KMSs are offline servers that communicate with end-user clients periodically (e.g., once a month) to create a secure identity based encryption framework, while the on-line transactions between the end-user clients (for media plane security) are based on an IBAKE framework which allows the participating clients to exchange key components in an asymmetric identity based encryption framework. This framework, in addition to eliminating passive escrow, allows for end-user clients to mutually authenticate each other (at the IMS media plane layer) and provides perfect forwards and backwards secrecy.

Observe that the KMS to client exchange is used sparingly (e.g., once a month)—hence the KMS is no longer required to be a high availability server, and in particular different KMSs do not have to communicate with each other (across operator boundaries). Moreover, given that asymmetric identity based encryption framework is used, the need for costly Public Key Infrastructure (PKI) and all the operational costs of certificate management and revocation is eliminated. Additionally, various IMS media plane features are securely supported—this includes secure forking, retargeting, deferred delivery, pre-encoded content, media clipping, and anonymity.

Extensions of the solution allow for secure conferencing applications, where an IMS conference application server authenticates users into a call but all participants of the call decide on a group key (with contributions from everybody) while the conference server itself does not learn the group key. Moreover, the group key can be modified to account for new participants and participants who exit a call. An additional feature of the IMS-based key management framework is that, despite the elimination of passive key escrow, it supports legally sharing security credentials with law enforcement using the concept of active escrow.

Figure 7:
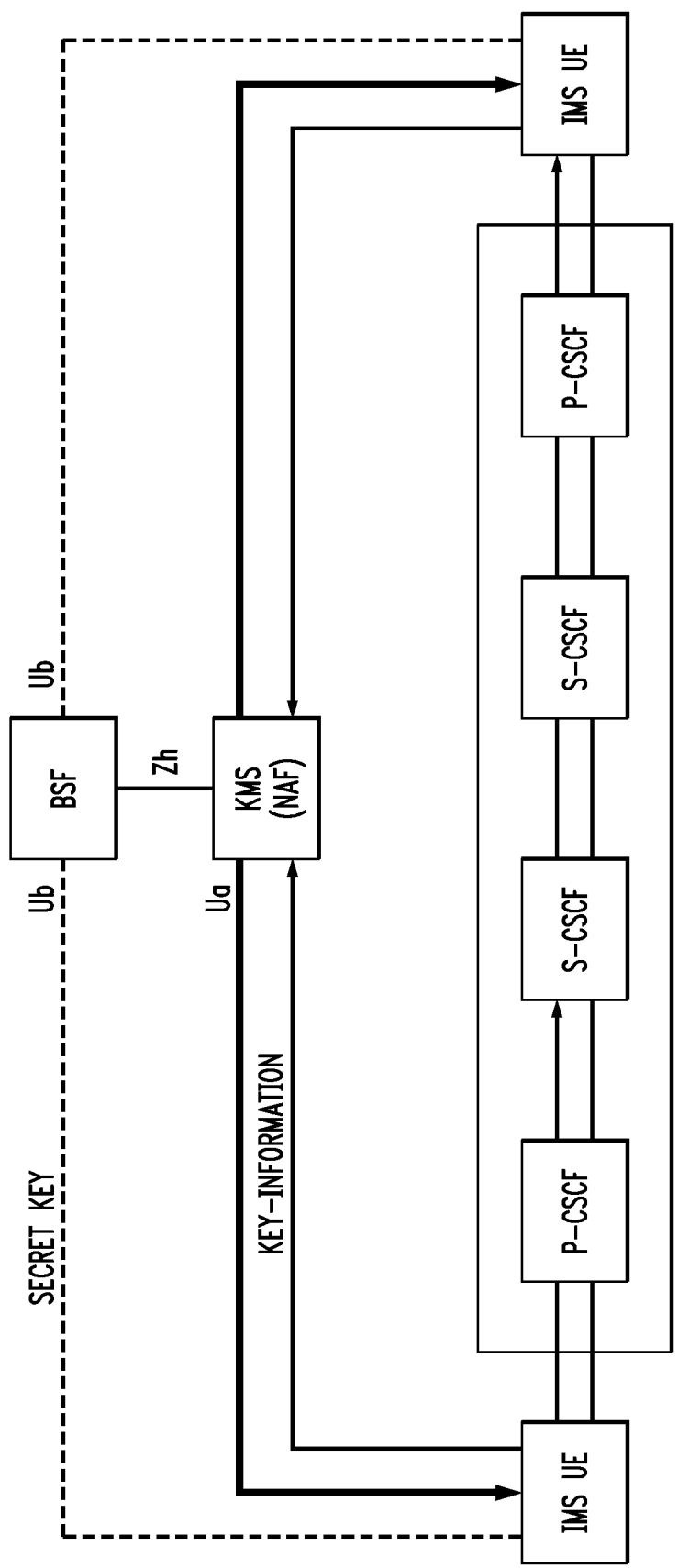
FIG. 7 illustrates network architecture for a secure key management protocol according to an IMS-based embodiment of the invention.

FIG. 7 provides a schematic of the architecture along with the entities involved in an example end-to-end key exchange protocol in the IMS media plane. It is understood that since the IMS architecture is well-known, the functional components depicted in FIG. 7 are not described in detail. Reference may be made to the IMS standards for detailed explanation of their functions. Note that, as is known, CSCF refers to a call session control function whereby P-CSCF is a proxy CSCF and S-CSCF is a serving CSCF. NAF refers to a network application function.

In the scenario illustrated, two IMS capable end user phones are engaged in an end-to-end (e2e) key exchange to secure communications in the application layer. Note that the illustration includes offline transactions between a UE (user equipment) and a KMS as well as online transactions between the UEs through IMS.

Observe that the UEs and the KMS share a pre-configured security association, wherein users can establish secure connections with the key management server and wherein mutual authentication is provided. One natural example in the context of 3GPP systems, is the use of Generalized Bootstrap Architecture (see, e.g., 3GPP TS 33.220, the disclosure of which is incorporated by reference herein). In FIG. 7, the transactions between the KMS and a UE are enabled through a BSF (bootstrapping server function) and recall that this transaction is performed sparingly (e.g., once a month). Note that if GBA is unavailable, other types of credentials such as IKEv2 with pre-shared keys or certificates (see, e.g., IETF RFC 4306, the disclosure of which is incorporated by reference herein) can be used for establishing this mutual authentication between the user and the KMS.

During this transaction, the UE presents it's subscription credentials following which the KMS generates a set of private keys (used in IBAKE). If this transaction is performed once a month, then the KMS may choose to generate one key for each day. The number of keys, and the frequency of this exchange is a matter of policy and it may be tied to the subscription. This flexibility is especially useful for prepay customers.

Note that rather than a single KMS, two different KMSs may be involved; one for user A, i.e., KMS_A, and one for user B, i.e., KMS_B. However, KMS_A and KMS_B do not have to communicate with each other. This scenario is especially applicable in inter-operator scenarios.

We now give a short summary of exchanges involved in the MIKEY-IBAKE in the IMS context.

Suppose A, B are the two users that are attempting to authenticate and agree on a key. At the same time, A and B represent their corresponding identities, which by definition also represent their public keys. Let $H_1(A)=Q_A$ and $H_1(B)=Q_B$ be the respective points on the elliptic curve corresponding to the public keys. In effect, one could refer to $Q_A$ and $Q_B$ as the public keys as well, since there is a one-to-one correspondence between the identities and the points on the curve obtained by applying $H_1$. Let x be a random number chosen by A, and let y be a random number chosen by B. Encryption below refers to identity based encryption as described above in section I.

The IMS-based MIKEY-IBAKE protocol exchange includes the following steps (with reference to components shown in FIG. 7):

1. IMS UE belonging to user A bootstraps with the BSF to be able to establish a secure connection with the KMS which acts as a NAF. This allows the BSF to authenticate the user and the user to indirectly authenticate the KMS. If GBA cannot be used, the IMS UE connects and authenticates to the KMS and establishes a shared key, based on a pre-established security association.

2. The IMS UE engages in a MIKEY exchange with the KMS and requests a secret key (or multiple secret keys, e.g., one for each day).

3. The KMS generates the media secret key(s) for IMS UE of user A and sends it to the user A.

4. The IMS UE of user A computes xP (i.e., P added to itself x times as a point on E, using the addition law on E) encrypts it using B's public key, and transmits it to IMS UE of user B.

5. The IMS core detects the INVITE and handles it in such a way that a network function, if authorized, can get access to the session key. This step in particular is applicable only to support the active escrow feature needed to satisfy any lawful intercept requirement.

6. The IMS UE of user B receives the INVITE including encrypted xP. IMS UE of user B decrypts the message and obtains xP. Subsequently B computes yP, and encrypts the pair {xP, yP} using the public key of IMS UE of user A and then transmits it in a response message to A.

7. Upon receipt of this message, IMS UE of user A decrypts the message and obtains yP. Subsequently IMS UE of user A encrypts yP using B's public key and sends it back in response conformation message to B. Following this, both A and B compute xyP as the session key.

8. At this point, the IMS UE of user B accepts the invitation and use of media security.

Observe that A chose x randomly, and received yP in the second step of the protocol exchange. This allows A to compute xyP by adding yP to itself x times. Conversely B chose y randomly, and received xP in the first step of the protocol exchange. This allows B to compute xyP by adding xP to itself y times.

Some advantageous properties that flow from the MIKEY-IBAKE protocol are as follows.

Mutual authentication. Observe that the contents of the payload in steps 4 and 7 are encrypted using B's public key. Hence B, and only B, can decrypt these messages. Similarly, the contents of the message in step 6 can be decrypted by A and only A. Also note that steps 6 and 7 allow B and A to authenticate with each other (by proving that the message was decrypted correctly). This novel feature allows for A and B to mutually authenticate each other without the aid of any online server or certificate authority.

Perfect secrecy. Observe that x and y are random. Hence the session key xyP is fresh and bears no relation to past or future transactions.

Elimination of passive escrow. Observe that, while the KMS (or a pair of KMSs) can decrypt the messages in the exchange, it is hard to determine xyP given xP and yP. The hardness assumption relies on the Diffie-Hellman problem over elliptic curves. Also note that, the curves used for IBE are KMS specific, and moreover need not be the same as the curve used to generate the session key. This flexibility offers a wide number of choices, and also eliminates any coordination needed between KMSs.

Identity management. As described above, to encrypt a message a sender uses a recipient's public key, generated using the identity (or one of the identities) of the recipient. The identity of the recipient may be in format that specifies a specific user, a group of users or any user. The naming of users and user groups may follow normal IMS conventions and may be extended with use of wildcards. In certain scenarios involving group applications, it may be natural to have a policy allowing all recipients in the group to use the secret key corresponding to the identity of that particular user group. For example, for enterprise users, it may be natural to have as a default that secret keys corresponding to identity of enterprise are distributed to all enterprise users. Note that due to the properties of identity based encryption, although all the users belonging to a group possibly possess the secret key of that group, all users nevertheless can not obtain the session key established between a sender and some other user belonging to that same group. To ensure that polices are enforced, it is also necessary that a public user identity can be securely bound to an IMS UE. In other words, it is important to the identity used by the user to authenticate against the KMS to a (set of) public identity.

We now discuss extensions of MIKEY-IBAKE protocol to various IMS-based use case scenarios. Note that these extensions were generally described above in section II. There description below is in the context of an IMS environment.

A. Lawful Intercept (LI) Through Active Escrow

To be able to provide a clear copy of intercepted communication, the following conditions have to be fulfilled:

1. It must be possible to intercept the traffic (both signalling and media).

2. The session keys used for actual traffic protection have to be available. To make the session keys available, KMS functions/services are required.

As stated above, the actual session keys used for traffic protection are generated between the sender and the recipient, thus not known by the KMS. Therefore, an active escrow solution is needed. In this scenario, for the KMS to obtain a session key between users A and B, it needs to establish an active session key between itself and user A and another simultaneous active session between itself and user B. The KMS pretends to be B towards A, and conversely. This 'man-in-the-middle' role played by the KMS is referred to as active escrow and similar to the methods used in a PKI environment where a Certificate Authority generates 'fake certificates' and sits in the middle of the exchange. The difference between the technique used in conventional CA's and our approach to active escrow is that the KMS does not have to generate fake keys.

With signaling traffic routed via the home network, intercept of the signaling traffic in the home network can be done at SIP (Session Initiation Protocol) server(s). This signaling traffic then needs to be routed towards the appropriate KMS in order for this KMS to establish the needed session keys with the corresponding users. In roaming situations, as the SIP signaling traffic normally is confidentiality protected between the IMS UE and the P-CSCF and considering that in current deployments the P-CSCF is located in the home network, the SIP signaling is only available in encrypted format at bearer level in the visited network.

For roaming scenarios, while encrypted SIP signaling and content will always be available, in order to intercept SIP signaling and decrypt the content of communication, there has to be an interoperation agreement between the visited network and the entity handling KMS. Typically, the KMS will reside in the home network so that, for LI performed by the visited network, cooperation with the home network is needed.

In line with LI standards, when the VPLMN (Visited Public Land Mobile Network) is not involved in the encryption, only encrypted content would be available for LI in the VPLMN.

B. Users in Different KMS Domains

Users in different KMS domains will have their secret keys generated by different KMSs. As a result, a different set of public parameters (e.g., cryptographic material) can be used to generate public and secret keys for users in different KMS domains. To ensure proper encryption/decryption, a sender and recipient need to know exact public parameters used by each side. Nevertheless, if a user in one KMS domain needs to establish a secure call to a user in another KMS domain the involved KMSs do not need to cooperate. As in any identity based cryptographic protocol, or for that matter any public key protocol, we can safely assume that public parameters needed for the exchange are publicly available or exchanged.

C. End-To-Middle Scenarios

In end-to-middle scenarios, media protection is between an IMS UE and a network entity. In a scenario when the call is initiated from an IMS UE, the set up of the call would follow the same principles as for an end-to-end protected call. The initiating IMS UE uses the identity of the network entity (e.g., MGWC—media gateway control) to encrypt xP as described above and sends it together with the INVITE. The MGWC intercepts the message, and generates yP in the same way as a receiving IMS UE would have done. The MGWC then sets up the MGW to have media security towards the IMS UE. The media traffic is forwarded in plain in the PSTN (public switched telephone network).

For incoming calls to IMS UEs, the MGWC checks that at least one terminal registered for the intended recipient has registered media security capabilities and preferences. If there is no media protection-capable terminal, the call is forwarded in plain. Otherwise, the MGWC chooses y and generates yP. The MGWC then inserts the encrypted yP (using the IMS UEs identity) in the INVITE and initiates use of media security in the MGW on the media traffic between the MGW and the IMS terminal.

D. Key Forking

In this section, forking is discussed for the case of IMS-based MIKEY-IBAKE. Recall that forking is generally described above in the context of FIG. 2. Forking is the delivery of a request (e.g., INVITE message) to multiple locations. This happens when a single IMS user is registered more than once. An example of forking is when a user has a desk phone, PC client, and mobile handset all registered with the same public identity.

Figure 8:
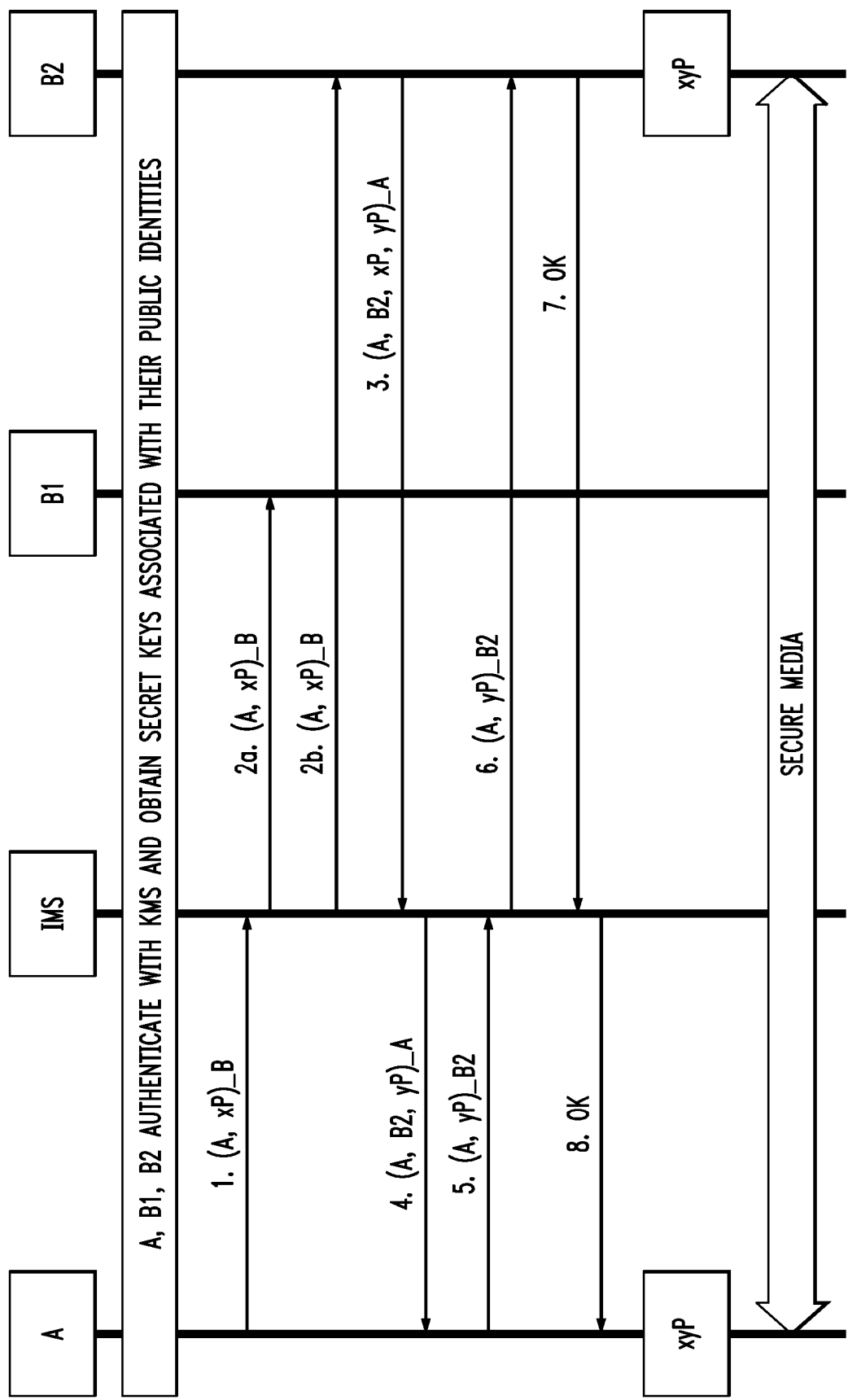
FIG. 8 illustrates a key forking methodology according to an IMS-based embodiment of the invention.

In the example depicted below and shown in the context of steps 1 through 8 of FIG. 8, assume that IMS UE of user B has multiple contact addresses registered with a single public user identity B. In other words, both B1 and B2 obtain a secret key corresponding to a public identity B. In this case, if IMS UE of user A wants to contact the IMS UE of user B, the request will be delivered to both B1 and B2. Assuming that B2 responds to a call, B2 first decrypts the message received using secret key associated with the identity B. B2 then chooses random y and sends to A a message including yP and its identity B2 encrypted using A's public identity. Upon receiving this message, user A decrypts it, realizes that it is communicating with user B2, and sends a response confirmation message including received yP encrypted using B2's public identity.

Observe that B1 is able to decrypt the message received from user A encrypted using B's public identity, therefore is able to obtain xP. However, it is not able to decrypt the message sent from B2 as it is encrypted using A's identity. Thus, user B1 is not able to obtain yP. Also note that even if B1 was able to obtain yP, it would still not be able to compute xyP. Note that in FIG. 7, (M)_X denotes that the message M is encrypted using the identity of X.

E. Redirection

In this section, session redirection (retargeting) is discussed for the case of IMS-based MIKEY-IBAKE. Recall that redirection is generally described above in the context of FIG. 3. Session redirection is a scenario in which a functional element decides to redirect the call to a different destination. Session redirection enables the typical services of "Session Forward Unconditional," "Session Forward Busy," "Session Forward Variable," "Selective Session Forwarding," and "Session Forward No Answer."

There are two basic scenarios of session redirection. In scenario one, a functional element (e.g., S-CSCF) decides to redirect the session using SIP REDIRECT method. In other words, the functional element passes the new destination information to the originator. As a result, the originator initiates a new session to the redirected destination provided by the functional element. For the case of MIKEY-IBAKE, this means that the originator will initiate a new session with the identity of the redirected destination.

In the second scenario, a functional element decides to redirect the session without informing the originator. A common scenario is one in which the S-CSCF of the destination user determines that the session is to be redirected. The user profile information obtained from the HSS (home subscriber server) by the 'Cx-pull' during registration may contain complex logic and triggers causing session redirection.

Figure 9:
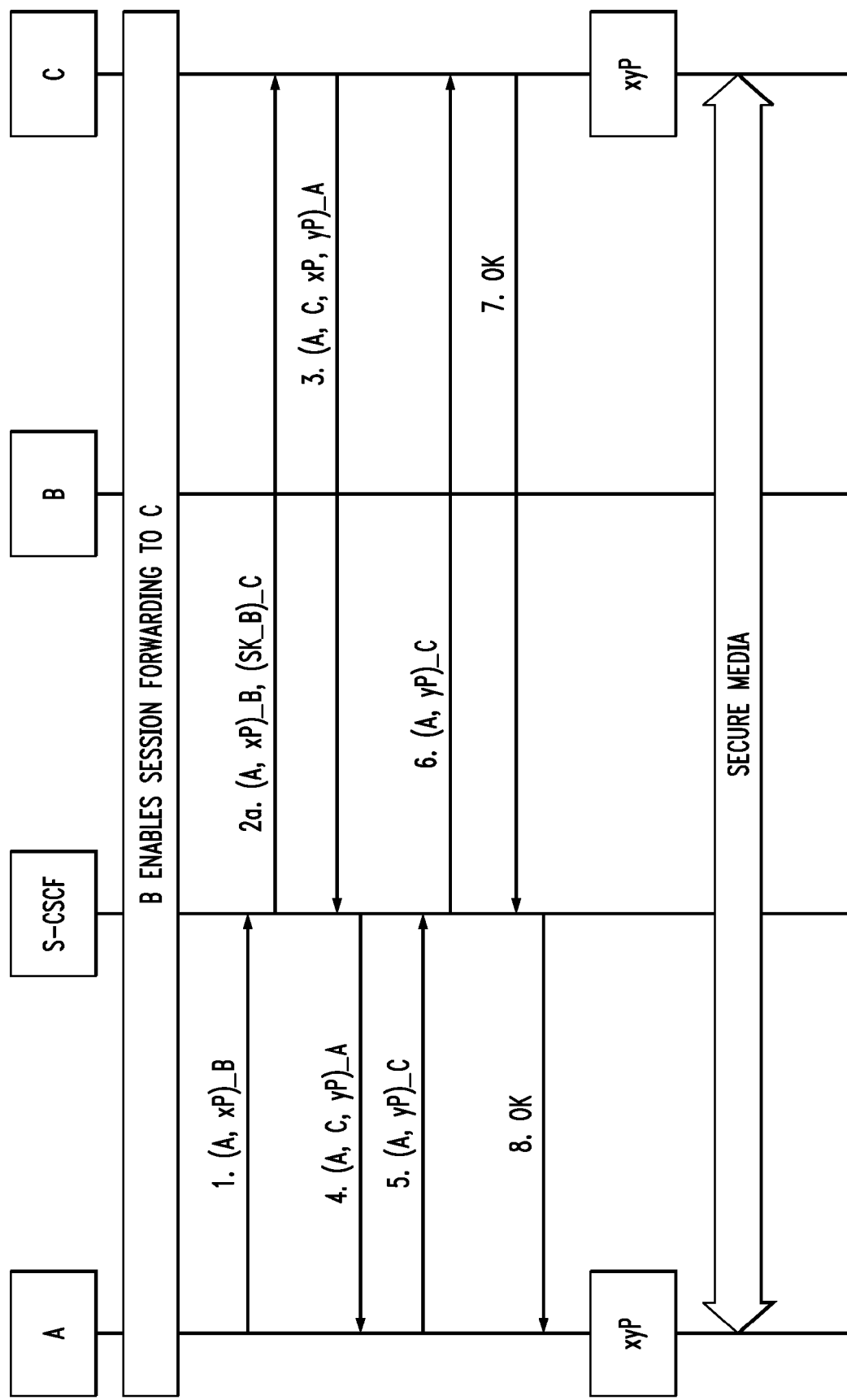
FIG. 9 illustrates a redirection methodology according to an IMS-based embodiment of the invention.

In the example depicted in steps 1 through 8 of FIG. 9, without loss of generality, it is assumed that the user B set up session forwarding to the user C. In this case, user B includes in its user profile its secret key SK_B encrypted using C's identity. Therefore, once the S-CSCF receives the message from user A and decides that the message needs to be redirected, it includes B's encrypted key in the message redirected to the user C. Upon receiving the message, the user C encrypts the secret key, and in turn, the message from A. User C then chooses random y and sends to A a message including yP and its identity C encrypted using A's public identity. Upon receiving this message, user A decrypts it, realizes that it is communicating to user C, and sends a response conformation message including received yP encrypted using C's public identity. In FIG. 9, (M)_X denotes that the message M is encrypted using the identity of X.

F. Deferred Delivery

In this section, deferred delivery is discussed for the case of IMS-based MIKEY-IBAKE. Recall from section II that deferred delivery is a type of service such that the session content can not be delivered to the destination at the time that it is being sent (e.g., the destination user is not currently online or decides not to answer the call). Nevertheless, the sender expects the network to deliver the message as soon as the recipient becomes available. A typical example of deferred delivery is voicemail.

Below, two basic scenarios of deferred delivery for the case of IMS-based MIKEY-IBAKE are presented. Reference may be made back to FIG. 4A for the first scenario and FIG. 4B for the second scenario.

In the first scenario, user A and B's mailbox perform mutual authentication before they agree on the key to be used for decrypting the content of the message intended for deferred delivery, while in the second scenario mutual authentication is not performed.

In the first scenario (again, reference may be made back to FIG. 4A where the functional element 402 is an IMS server), it is assumed that the user A is trying to reach the user B, who is currently not available, therefore the call is forwarded to the B's 'voicemail' (more generally, deferred delivery server). Following the MIKEY-IBAKE protocol, the message received by B's mailbox is encrypted using B's identity, therefore B's mailbox will not be able to decrypt it. B's mailbox chooses random y and computes yP and send its identity and yP IBE-encrypted to the user A. The user A recognizes that B did not receive the message and that the actual recipient was not able to decrypt the message sent in the first step by the lack of its identity and xP. Therefore, the user sends a new message containing A's identity, B's mailbox identity, xP and yP all IBE-encrypted using B's mailbox identity. Upon reception of this message, B's mailbox accepts "sK" as the session key for the message intended for B and return A's identity and xP to the user A to complete the authentication.

Observe that sK is encrypted using B's public key; hence mailbox B cannot decrypt this message and obtain "sK." Subsequently, when B is online and checks 'voicemail' (checks with the deferred delivery server), B can obtain the encrypted value of sK from the mailbox server. Note that B may have to authenticate with the mailbox to obtain the key—this could be based on existing authentication mechanisms already in place.

In the second scenario (again, reference may be made back to FIG. 4B where the functional element 402 is an IMS server), the same assumption holds—the user A is trying to reach the user B, which is currently not available, therefore the call is forwarded to B's voicemail. However, in this case, B's mailbox and user A do not perform the authentication. Instead, B's mailbox just accepts sK as the session key and returns an OK message to the user A to confirm it.

G. Group and Conference Calls

In this section, the key management protocol of MIKEY-IBAKE is extended to group and conference calls. Note that the advantageous properties that flow from the MIKEY-IBAKE protocol are therefore realized in a conferencing environment. Recall that conferencing was generally described above in the context of FIGS. 6A through 6C. Note that the IMS example in FIG. 10 is for N=3.

Figure 10:
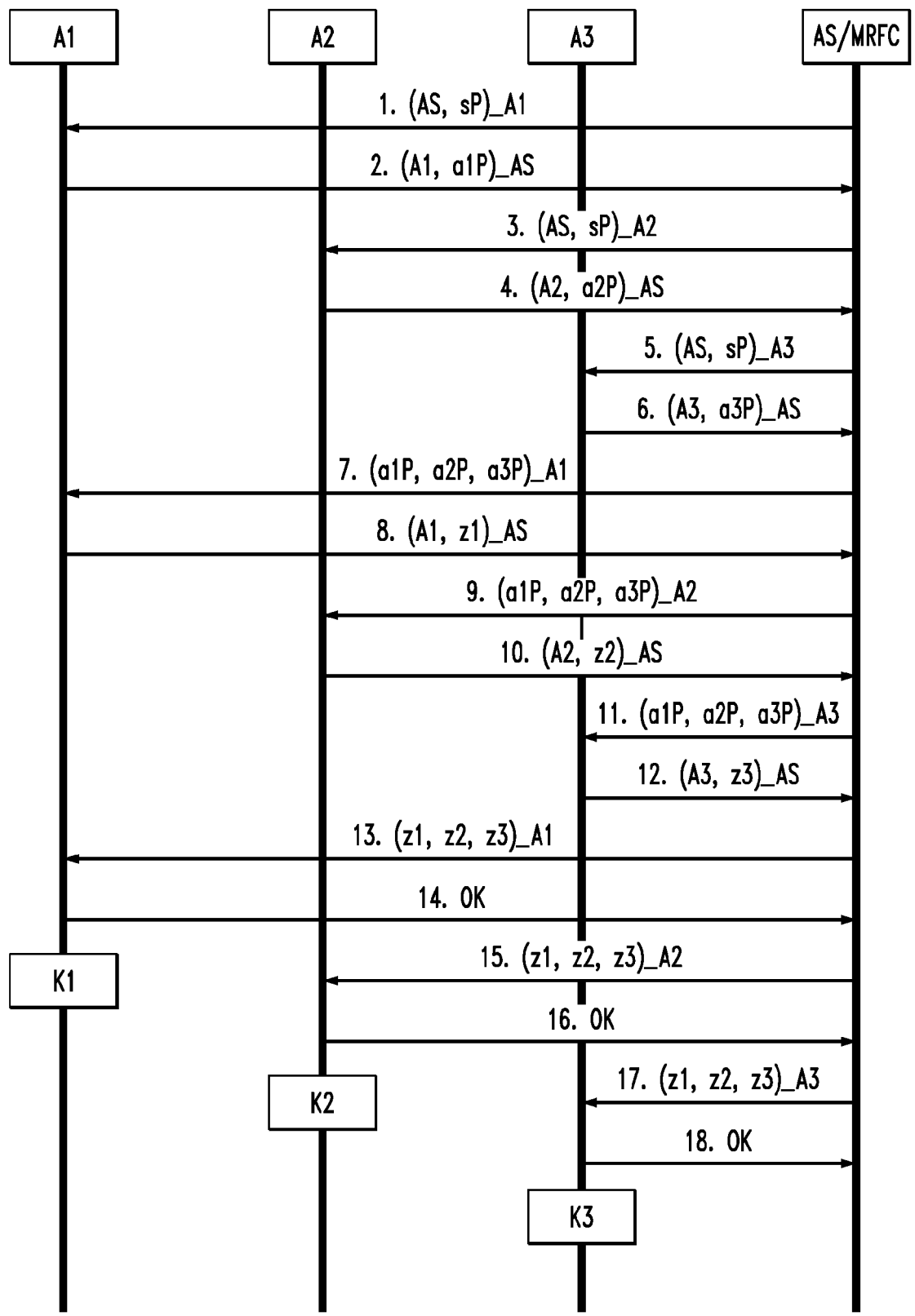
FIG. 10 illustrates a conferencing methodology with three participants according to an IMS-based embodiment of the invention.

In the IMS-based scenario depicted in steps 1 through 18 of FIG. 10, it is assumed that there is a conference server (AS/MRFC—application server/multimedia resource function controller) that invites users to the conference call. This could be a result of, for example, previously received REFER request from another user. An alternative approach would be to delegate this function to one of the users (e.g., conference chair). Although this alternative is not shown in FIG. 10, the approach would be similar and the computation of the group key would be the same.

In the description below, it is assumed that all messages are IBE encrypted (e.g., if a user Y is sending a message M to a user X, then the message M is encrypted using X's identity) using the appropriate identity. In FIG. 10, this is denoted as (M)_X meaning the message M is IBE encrypted using the identity of X.

In the first set of exchanges with the conference server, users $A_1$, $A_2$, and $A_3$ choose random $a_1$, $a_2$, and $a_3$ respectively and each user $A_i$ sends $w_i=a_iP$ to the conference server. In the second set of exchanges the conference server sends all $a_iP$'s to every user, while each user sends $z_i=a_i(a_{i+1}P-a_{i-1}P)$. In the final exchange, the conference server sends all $z_i$'s to each user. Upon this, all conference participants are able to compute the group key as follows: $K_i=3a_iw_{i-1}+2z_i+z_{i+1}$.

Note that $K_1=K_2=K_3$. Also note, while users $A_1$, $A_2$, and $A_3$ are able to generate the group key, the conference server is not since while it knows the $z_i$'s and $w_i$'s, only individual users know their randomly chosen $a_i$.

For simplicity reasons, above discussion focuses on three conference call participants. However, the above procedures can be generalized to n participants. In case of n participants, the group key is generated as $K_i=na_iw_{i-1}+(n-1)z_i+(n-2)z_{i+1}+\ldots+z_{i-2}$, where $w_i$ and $z_i$ are as defined above.

One of the important features of the protocol is that the group key changes every time a new user is admitted or an existing user exits the call. This ensures that new users do not learn the group key before they were added to the call, and users who leave the call prematurely do not gain access to the conversations after the call.

Observe that when a new user is added, and there are N users in the system already, then there will be a total of N+1 users in the system. When these users are placed in a circle, then the user next to the N-th user is now the (N+1)th user (and not the $1^{st}$ user, which was the case prior to admitting the N+1th user). The protocol to admit a new user works as follows:

The new user authenticates with the conference server using IBAKE, similar to every user. This allows the user to be admitted (and authorized to the call), and the new user is guaranteed of joining the correct conference (via authentication of the conference server).

Let $z_{N+1}=a_{N+1}P$ be the value chosen by the new user during authentication.

The conference server then sends the set $\{z_i\}$ for all i=1 to N+1 to all users, either broadcast or unicast. This allows all users to learn of the new user, and determine their new neighbors. Observe that the neighbor list changes only for users 1, N, and N+1.

Users 1, N, and N+1 then compute their corresponding value of w, and send it back to the conference server (individually).

The server then sends an updated list of $\{w_i\}$ to all users.

All participants then recompute the group key using the same relation as above, except N is replaced by N+1 and the new values of $z_i$ and $w_i$.

When a user exits the conference call, then no new authentication procedures have to be executed, but the group key changes. The procedure works as follows:

The conference server learns about the user exiting the conference call.

Subsequently, the conference server informs everybody of this event and information pertaining to which user (not just identity, but also includes the order) exited the call. In order to simplify matters, the conference server may resend the new list $\{z_i\}$ This allows all users to rediscover their neighbors, and recompute $w_i$, if necessary.

All those participants remaining in the call, for whom $w_i$ changed, will inform the conference server their new value.

The conference server then sends the updated list $\{w_i\}$.

All participants then recompute the group key using the same relation as above, except N is replaced by N−1 and the new values of $w_i$ are used.

IV. Illustrative Computing System

FIG. 11 illustrates a generalized hardware architecture 1100 of a network environment and communication devices in the form of computing devices suitable for implementing a secure key management protocol between two entities according to the present invention. While FIG. 11 shows only two entities, it is to be understood that other entities can have the same configuration. Thus, in terms of the secure key management protocols described above, the two entities may be initiator 102-I (a first party or A) and responder 102-R (a second party or B). However, KMSs, conference servers, LI servers, functional elements, additional client devices (parties) and additional servers may be implemented with the same architecture as shown in a computing device of FIG. 11. Thus, for the sake of simplicity, all the computing devices (communication devices) that may participate in the protocols of the invention are not shown in FIG. 11.

As shown, A's computing device designated 1102 and B's computing device designated 1104 are coupled via a network 1106. The network may be any network across which the devices are able to communicate, for example, as in the embodiments described above, the network 1106 could include a publicly-accessible wide area communication network such as a cellular communication network operated by a network operator (e.g., Verizon, AT&T, Sprint). However, the invention is not limited to a particular type of network. Typically, the devices could be client machines. Examples of client devices that may be employed by the parties to participate in the protocols described herein may include, but are not limited to, cellular phones, smart phones, desktop phones, personal digital assistants, laptop computers, personal computers, etc. However, one or more of the devices could be servers. Thus, it is to be understood that the communication protocol of the present invention is not limited to the case where the computing systems are client and server, respectively, but instead is applicable to any computing devices comprising the two network elements.

As would be readily apparent to one of ordinary skill in the art, the servers and clients may be implemented as programmed computers operating under control of computer program code. The computer program code would be stored in a computer readable storage medium (e.g., a memory) and the code would be executed by a processor of the computer. Given this disclosure of the invention, one skilled in the art could readily produce appropriate computer program code in order to implement the protocols described herein.

Nonetheless, FIG. 11 generally illustrates an exemplary architecture for each computer system communicating over the network. As shown, device 1102 comprises I/O devices 1108-A, processor 1110-A, and memory 1112-A. Device 1104 comprises I/O devices 1108-B, processor 1110-B, and memory 1112-B. It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for performing an authenticated key agreement protocol, in accordance with a multimedia communication system, between a first party at a first computing device and a second party at a second computing device, the method at the first party comprising steps of:

obtaining at least one private key for the first party from a key service at a third computing device;

sending a first message comprising an encrypted first random key component from the first computing device to the second computing device, the first random key component having been computed at the first computing device, and the first message having been encrypted using a public key of the second party in accordance with an identity based encryption operation;

receiving a second message comprising an encrypted random key component pair at the first computing device from the second computing device, the random key component pair having been formed from the first random key component and a second random key component computed at the second computing device, and the second message having been encrypted at the second computing device using a public key of the first party in accordance with the identity based encryption operation;

decrypting the second message using the private key obtained by the first computing device from the third computing device to obtain the second random key component;

sending a third message comprising the second random key component from the first computing device to the second computing device, the third message having been encrypted using the public key of the second party in accordance with the identity based encryption operation; and computing at the first computing device a secure key based on the second random key component, the secure key being used for conducting at least one call session with the second party via a media plane of the multimedia communication system;

wherein the first message, the second message and the third message comprise respective messages of an end-to-end key exchange between the first party and the second party—communicated in the media plane of an Internet Protocol Multimedia Subsystem; and wherein the first message is an INVITE message associated with the Internet Protocol Multimedia Subsystem.

2. The method of claim 1, wherein one or more of the encrypted messages exchanged between the first computing device and the second computing device contain at least one of an identity associated with the first party and an identity associated with the second party.

3. The method of claim 1, wherein the step of obtaining the at least one private key from the key service further comprises an exchange wherein the first computing device sends a first party identifier to the third computing device, and receives the at least one private key from the third computing device which is generated by the third computing device based on the first party identifier.

4. The method of claim 3, wherein the exchange between the first computing device and the third computing device is performed in accordance with a secure communication protocol.

5. The method of claim 4, wherein a Generalized Bootstrap Architecture (GBA) is used to determine a key to use in the secure communications protocol between the first computing device and the third computing device.

6. The method of claim 3, wherein the exchange between the first computing device and the third computing device is performed based on at least one of: (i) a time-based schedule; (ii) a call session frequency-based schedule; and (iii) a subscription-based schedule.

7. The method of claim 1, wherein the first computing device obtains two or more private keys from the third computing device including the at least one private key used for the authenticated key agreement with the second party.

8. The method of claim 7, wherein other ones of the two or more private keys obtained by the first computing device are useable for performing separate authenticated key agreement operations.

9. The method of claim 7, wherein the first party has two or more identities and a separate private key for each of the two or more identities.

10. The method of claim 1, further comprising receiving at the first computing device a fourth message comprising a verification from the second computing device, the fourth message having been encrypted at the second computing device using the public key of the first party in accordance with the identity based encryption operation.

11. The method of claim 1, wherein the respective public keys used by the first party and the second party to perform the identity based encryption operation comprise a result of a hash function applied to information indicative of an identity of the respective party to which the public key is assigned and wherein an output of the hash function is a point on an elliptic curve.

12. The method of claim 1, wherein the first random key component is computed from a first random number chosen by the first party and a value selected from a group associated with a given cryptographic key protocol, and the second random key component is computed from a second random number chosen by the second party and a value selected from a group associated with the given cryptographic key protocol.

13. The method of claim 12, wherein the secure key for use in the call session between the first party and the second party is computed at the first computing device from the first random number and the second random key component.

14. The method of claim 1, wherein the multimedia communication system comprises the Internet Protocol Multimedia Subsystem.

15. The method of claim 1, wherein a format of one or more of the messages exchanged between the first computing device and the second computing device is based on a Multimedia Internet Keying format.

16. A method for performing an authenticated key agreement protocol, in accordance with a multimedia communication system, between a first party at a given computing device and a second party, the method comprising steps of:

obtaining at least one private key for the first party from a key service at a key service computing device, wherein the second party has multiple computing devices associated therewith such that there is a first computing device of the second party and at least a second computing device of the second party;

sending a first message comprising an encrypted first random key component from the given computing device to the second party, the first random key component having been computed at the given computing device, and the first message having been encrypted using a public key of the second party in accordance with an identity based encryption operation;

receiving a second message comprising an encrypted random key component pair at the given computing device from one of the first and second computing devices of the second party, the random key component pair having been formed from the first random key component and a second random key component computed at the one of the first and second computing devices of the second party, and the second message having been encrypted at the one of the first and second computing devices of the second party using a public key of the first party in accordance with the identity based encryption operation such that the other of the first and second computing devices is not able to decrypt the second message;

decrypting the second message using the private key obtained by the given computing device from the key service computing device to obtain the second random key component;

identifying that the second message came from the one of the first and second computing devices of the second party;

sending a third message comprising the second random key component from the given computing device to the one of the first and second computing devices of the second party, the third message having been encrypted using a public key of the one of the first and second computing devices of the second party that created the second message in accordance with the identity based encryption operation; and computing at the given computing device a secure key based on the second random key component, the secure key being used for conducting at least one call session with the one of the first and second computing devices of the second party via a media plane of the multimedia communication system;

wherein the first message, the second message and the third message comprise respective messages of an end-to-end key exchange between the first party and the second party—communicated in the media plane of an Internet Protocol Multimedia Subsystem; and wherein the first message is an INVITE message associated with the Internet Protocol Multimedia Subsystem.

17. The method of claim 16, wherein each computing device of the second party and the second party itself has their own private keys obtained from the key service computing device whereby each one of the computing devices of the second party knows its own private key and the private key of the second party itself but not the private keys of the other computing devices of the second party.

18. The method of claim 16, wherein one or more of the encrypted messages exchanged between the given computing device and the one of the first and second computing devices of the second party contain at least one of an identity associated with the first party, an identity associated with the second party, and identities of the first or second computing device of the second party.

19. A method for performing an authenticated key agreement protocol, in accordance with a multimedia communication system, between a first party at a first computing device and another party, the method comprising steps of:
obtaining at least one private key for the first party from a key service at a key service computing device;
sending a first message comprising an encrypted first random key component from the first computing device to a second party at a second computing device, the first random key component having been computed at the first computing device, and the first message having been encrypted using a public key of the second party in accordance with an identity based encryption operation, wherein a functional element in the multimedia communication system, having made a decision that the first message be redirected to a third party at a third computing device and having received a private key of the second party encrypted using a public key of the third party in accordance with the identity based encryption operation, redirects the first message to the third computing device along with the previously received encrypted private key of the second party;
receiving a second message comprising an encrypted random key component pair at the first computing device from the third computing device, the random key component pair having been formed from the first random key component and a second random key component computed at the third computing device, and the second message having been encrypted at the third computing device using a public key of the first party in accordance with the identity based encryption operation;
decrypting the second message using the private key obtained by the first computing device from the key service computing device to obtain the second random key component;
sending a third message comprising the second random key component from the first computing device to the third computing device, the third message having been encrypted using the public key of the third party in accordance with the identity based encryption operation; and
computing at the first computing device a secure key based on the second random key component, the secure key being used for conducting at least one call session with the third party via a media plane of the multimedia communication system;
wherein the first message, the second message and the third message comprise respective messages of an end-to-end key exchange between the first party and the third party communicated in the media plane of an Internet Protocol Multimedia Subsystem; and
wherein the first message is an INVITE message associated with the Internet Protocol Multimedia Subsystem.

20. The method of claim 19, wherein the functional element is unable to decrypt the message sent thereto from the second party since the message is encrypted using the public key of the third party.

21. The method of claim 19, wherein the functional element comprises an application server in the multimedia communication system.

22. The method of claim 19, wherein one or more of the encrypted messages exchanged between the parties contain at least one of an identity associated with the first party, an identity associated with the second party, and an identity associated with the third party.

23. A method for performing an authenticated key agreement protocol, in accordance with a multimedia communication system, between a first party at a first computing device and another party, the method comprising steps of:
obtaining at least one private key for the first party from a key service at a key service computing device;
sending a first message comprising an encrypted first random key component from the first computing device to a second party at a second computing device, the first random key component having been computed at the first computing device, and the first message having been encrypted using a public key of the second party in accordance with an identity based encryption operation, wherein a functional element in the multimedia communication system, having determined that the second party is unavailable, forwards the first message to a temporary destination at a temporary destination computing device associated with the second party;
receiving a second message comprising an encrypted second random key component at the first computing device from the temporary destination computing device associated with the second party, the second random key component computed at the temporary destination computing device, and the second message having been encrypted at the temporary destination computing device using a public key of the first party in accordance with the identity based encryption operation;
decrypting the second message using the private key obtained by the first computing device from the key service computing device to obtain the second random key component;
identifying that the second message came from the temporary destination computing device;
sending a third message from the first computing device to the temporary destination computing device comprising an encrypted random key component pair, the random key component pair having been formed from the first random key component and a second random key component and encrypted at the first computing device using a public key of the temporary destination computing device in accordance with the identity based encryption operation, and the third message also comprising an encrypted random secret key computed at the first computing device and encrypted at the first computing device using a public key of the second party in accordance with the identity based encryption operation; and
receiving a fourth message at the first computing device from the temporary destination computing device comprising the encrypted first random key component, the first random key component having been computed at the first computing device, and the fourth message having been encrypted using a public key of the first party in accordance with an identity based encryption operation;
wherein the first message, the second message and the third message comprise respective messages of a key exchange between the first party and the temporary destination communicated in the media plane of an Internet Protocol Multimedia Subsystem; and wherein the first message is an INVITE message associated with the Internet Protocol Multimedia Subsystem.

24. The method of claim 23, wherein the temporary destination computing device is unable to decrypt the random secret key since the temporary destination computing device does not have a private key of the second party.

25. The method of claim 23, wherein the temporary destination computing device provides the encrypted random secret key to the second party upon request and after a mutual authentication operation.

26. The method of claim 23, wherein the temporary destination comprises a mailbox of the second party.

27. The method of claim 23, wherein one or more of the encrypted messages exchanged between the parties contain at least one of an identity associated with the first party, an identity associated with the second party, and an identity associated with the temporary destination.

28. The method of claim 23, wherein an authenticated key agreement protocol is not performed but rather, in the first message, the first computing device sends an encrypted random secret key computed at the first computing device and encrypted at the first computing device using a public key of the second party in accordance with the identity based encryption operation, and wherein the functional element, having determined that the second party is unavailable, forwards the first message to the temporary destination at the temporary destination computing device associated with the second party.

29. The method of claim 28, wherein the temporary destination computing device provides the encrypted random secret key to the second party upon request and after a mutual authentication operation.

30. A method for performing an authenticated key agreement protocol, in accordance with a multimedia communication system, between a first party at a first computing device and a second party at a second computing device, the method comprising steps of:
obtaining at least one private key for the first party from a key service at a third computing device;
sending a first message comprising an encrypted first random key component from the first computing device for intended receipt by the second computing device, the first random key component having been computed at the first computing device, and the first message having been encrypted using a public key of the second party in accordance with an identity based encryption operation, wherein the first message is intercepted by at least one functional element of the multimedia communication system;
receiving a second message comprising an encrypted random key component pair at the first computing device from the functional element, the random key component pair having been formed from the first random key component and a second random key component computed at the functional element, and the second message having been encrypted at the functional element using a public key of the first party in accordance with the identity based encryption operation;
decrypting the second message using the private key obtained by the first computing device from the third computing device to obtain the second random key component;
sending a third message comprising the second random key component from the first computing device for intended receipt by the second computing device, the third message having been encrypted using the public key of the second party in accordance with the identity based encryption operation, wherein the third message is intercepted by the functional element; and
computing at the first computing device a secure key based on the second random key component, the secure key being used for conducting at least one call session with the second party via a media plane of the multimedia communication system; wherein the functional element is able to compute the same secure key;
wherein the first message, the second message and the third message comprise respective messages of an end-to-end key exchange between the first party and the second party—communicated in the media plane of an Internet Protocol Multimedia Subsystem; and
wherein the first message is an INVITE message associated with the Internet Protocol Multimedia Subsystem.

31. The method of claim 30, wherein the at least one functional element imitates the first party in sending and receiving messages during the authenticated key agreement operation such that the second party establishes a secure key with the functional element that the second party believes was agreed upon by the first party.

32. The method of claim 30, wherein the at least one functional element comprises one or more of a law enforcement-controlled computing device and a computing device associated with the key service.

33. An apparatus for performing an authenticated key agreement protocol, in accordance with a multimedia communication system, between a first party at a first computing device and a second party at a second computing device, the apparatus at the first computing device comprising:
a memory; and
at least one processor coupled to the memory and configured to:
obtain at least one private key for the first party from a key service at a third computing device;
send a first message comprising an encrypted first random key component from the first computing device to the second computing device, the first random key component having been computed at the first computing device, and the first message having been encrypted using a public key of the second party in accordance with an identity based encryption operation;
receive a second message comprising an encrypted random key component pair at the first computing device from the second computing device, the random key component pair having been formed from the first random key component and a second random key component computed at the second computing device, and the second message having been encrypted at the second computing device using a public key of the first party in accordance with the identity based encryption operation;
decrypt the second message using the private key obtained by the first computing device from the third computing device to obtain the second random key component;
send a third message comprising the second random key component from the first computing device to the second computing device, the third message having been encrypted using the public key of the second party in accordance with the identity based encryption operation; and
compute at the first computing device a secure key based on the second random key component, the secure key being used for conducting at least one call session with the second party via a media plane of the multimedia communication system;
wherein the first message, the second message and the third message comprise respective messages of an end-to-end key exchange between the first party and the second party—communicated in the media plane of an Internet Protocol Multimedia Subsystem; and wherein the first message is an INVITE message associated with the Internet Protocol Multimedia Subsystem.

34. A method for performing an authenticated key agreement protocol, in accordance with a multimedia communication system, between a first party at a first computing device and a second party at a second computing device, the method at the second party comprising steps of:

receiving a first message comprising an encrypted first random key component from the first computing device at the second computing device, the first random key component having been computed at the first computing device, and the first message having been encrypted using a public key of the second party in accordance with an identity based encryption operation;

sending a second message comprising an encrypted random key component pair to the first computing device from the second computing device, the random key component pair having been formed from the first random key component and a second random key component computed at the second computing device, and the second message having been encrypted at the second computing device using a public key of the first party in accordance with the identity based encryption operation;

receiving a third message comprising the second random key component from the first computing device at the second computing device, the third message having been encrypted using the public key of the second party in accordance with the identity based encryption operation, and wherein the second message having been decrypted at the first computing device, using a private key obtained by the first computing device from a key service at a third computing device, to obtain the second random key component; and computing at the second computing device a secure key based on the first random key component, the secure key being used for conducting at least one call session with the first party via a media plane of the multimedia communication system;

wherein the first message, the second message and the third message comprise respective messages of an end-to-end key exchange between the first party and the second party—communicated in the media plane of an Internet Protocol Multimedia Subsystem; and wherein the first message is an INVITE message associated with the Internet Protocol Multimedia Subsystem.

35. An apparatus for performing an authenticated key agreement protocol, in accordance with a multimedia communication system, between a first party at a first computing device and a second party at a second computing device, the apparatus at the second computing device comprising:

a memory; and at least one processor coupled to the memory and configured to:

receive a first message comprising an encrypted first random key component from the first computing device at the second computing device, the first random key component having been computed at the first computing device, and the first message having been encrypted using a public key of the second party in accordance with an identity based encryption operation;

send a second message comprising an encrypted random key component pair to the first computing device from the second computing device, the random key component pair having been formed from the first random key component and a second random key component computed at the second computing device, and the second message having been encrypted at the second computing device using a public key of the first party in accordance with the identity based encryption operation;

receive a third message comprising the second random key component from the first computing device at the second computing device, the third message having been encrypted using the public key of the second party in accordance with the identity based encryption operation, and wherein the second message having been decrypted at the first computing device, using a private key obtained by the first computing device from a key service at a third computing device, to obtain the second random key component; and compute at the second computing device a secure key based on the first random key component, the secure key being used for conducting at least one call session with the first party via a media plane of the multimedia communication system;

wherein the first message, the second message and the third message comprise respective messages of an end-to-end key exchange between the first party and the second party—communicated in the media plane of an Internet Protocol Multimedia Subsystem; and wherein the first message is an INVITE message associated with the Internet Protocol Multimedia Subsystem.

36. Apparatus for performing an authenticated key agreement protocol, in accordance with a multimedia communication system, between a first party at a given computing device and a second party, the apparatus at the given computing device comprising:

a memory; and at least one processor couples to the memory and configured to:

obtain at least one private key for the first party from a key service at a key service computing device, wherein the second party has multiple computing devices associated therewith such that there is a first computing device of the second party and at least a second computing device of the second party;

send a first message comprising an encrypted first random key component from the given computing device to the second party, the first random key component having been computed at the given computing device, and the first message having been encrypted using a public key of the second party in accordance with an identity based encryption operation;

receive a second message comprising an encrypted random key component pair at the given computing device from one of the first and second computing devices of the second party, the random key component pair having been formed from the first random key component and a second random key component computed at the one of the first and second computing devices of the second party, and the second message having been encrypted at the one of the first and second computing devices of the second party using a public key of the first party in accordance with the identity based encryption operation such that the other of the first and second computing devices is not able to decrypt the second message;

decrypt the second message using the private key obtained by the given computing device from the key service computing device to obtain the second random key component;

identify that the second message came from the one of the first and second computing devices of the second party;

send a third message comprising the second random key component from the given computing device to the one of the first and second computing devices of the second party, the third message having been encrypted using a public key of the one of the first and second computing devices of the second party that created the second message in accordance with the identity based encryption operation; and compute at the given computing device a secure key based on the second random key component, the secure key being used for conducting at least one call session with the one of the first and second computing devices of the second party via a media plane of the multimedia communication system;

wherein the first message, the second message, the third message and the fourth message comprise respective messages of an end-to-end key exchange between the first party and the second party-communicated in the media plane of an Internet Protocol Multimedia Subsystem; and wherein the first message is an INVITE message associated with the Internet Protocol Multimedia Subsystem.

37. Apparatus for performing an authenticated key agreement protocol, in accordance with a multimedia communication system, between a first party at a first computing device and another party, the apparatus at the first computing device comprising:

a memory; and at least one processor couples to the memory and configured to:

obtain at least one private key for the first party from a key service at a key service computing device;

send a first message comprising an encrypted first random key component from the first computing device to a second party at a second computing device, the first random key component having been computed at the first computing device, and the first message having been encrypted using a public key of the second party in accordance with an identity based encryption operation, wherein a functional element in the multimedia communication system, having made a decision that the first message be redirected to a third party at a third computing device and having received a private key of the second party encrypted using a public key of the third party in accordance with the identity based encryption operation, redirects the first message to the third computing device along with the previously received encrypted private key of the second party;

receive a second message comprising an encrypted random key component pair at the first computing device from the third computing device, the random key component pair having been formed from the first random key component and a second random key component computed at the third computing device, and the second message having been encrypted at the third computing device using a public key of the first party in accordance with the identity based encryption operation;

decrypt the second message using the private key obtained by the first computing device from the key service computing device to obtain the second random key component;

send a third message comprising the second random key component from the first computing device to the third computing device, the third message having been encrypted using the public key of the third party in accordance with the identity based encryption operation; and compute at the first computing device a secure key based on the second random key component, the secure key being used for conducting at least one call session with the third party via a media plane of the multimedia communication system;

wherein the first message, the second message and the third message comprise respective messages of an end-to-end key exchange between the first party and the third party communicated in the media plane of an Internet Protocol Multimedia Subsystem; and wherein the first message is an INVITE message associated with the Internet Protocol Multimedia Subsystem.

38. Apparatus for performing an authenticated key agreement protocol, in accordance with a multimedia communication system, between a first party at a first computing device and another party, the apparatus at the first computing device comprising:

a memory; and at least one processor couples to the memory and configured to:

obtain at least one private key for the first party from a key service at a key service computing device;

send a first message comprising an encrypted first random key component from the first computing device to a second party at a second computing device, the first random key component having been computed at the first computing device, and the first message having been encrypted using a public key of the second party in accordance with an identity based encryption operation, wherein a functional element in the multimedia communication system, having determined that the second party is unavailable, forwards the first message to a temporary destination at a temporary destination computing device associated with the second party;

receive a second message comprising an encrypted second random key component at the first computing device from the temporary destination computing device associated with the second party, the second random key component computed at the temporary destination computing device, and the second message having been encrypted at the temporary destination computing device using a public key of the first party in accordance with the identity based encryption operation;

decrypt the second message using the private key obtained by the first computing device from the key service computing device to obtain the second random key component;

identify that the second message came from the temporary destination computing device;

send a third message from the first computing device to the temporary destination computing device comprising an encrypted random key component pair, the random key component pair having been formed from the first random key component and a second random key component and encrypted at the first computing device using a public key of the temporary destination in accordance with the identity based encryption operation, and the third message also comprising an encrypted random secret key computed at the first computing device and encrypted at the first computing device using a public key of the second party in accordance with the identity based encryption operation; and receive a fourth message at the first computing device from the temporary destination computing device comprising the encrypted first random key component, the first random key component having been computed at the first computing device, and the fourth message having been encrypted using a public key of the first party in accordance with an identity based encryption operation;

wherein the first message, the second message, the third message and the fourth message comprise respective messages of a key exchange between the first party and the temporary destination communicated in the media plane of an Internet Protocol Multimedia Subsystem; and wherein the first message is an INVITE message associated with the Internet Protocol Multimedia Subsystem.

39. Apparatus for performing an authenticated key agreement protocol, in accordance with a multimedia communication system, between a first party at a first computing device and a second party at a second computing device, the apparatus at the first computing device comprising:

a memory; and at least one processor couples to the memory and configured to:

obtain at least one private key for the first party from a key service at a third computing device;

send a first message comprising an encrypted first random key component from the first computing device for intended receipt by the second computing device, the first random key component having been computed at the first computing device, and the first message having been encrypted using a public key of the second party in accordance with an identity based encryption operation, wherein the first message is intercepted by at least one functional element of the multimedia communication system;

receive a second message comprising an encrypted random key component pair at the first computing device from the functional element, the random key component pair having been formed from the first random key component and a second random key component computed at the functional element, and the second message having been encrypted at the functional element using a public key of the first party in accordance with the identity based encryption operation;

decrypt the second message using the private key obtained by the first computing device from the third computing device to obtain the second random key component;

send a third message comprising the second random key component from the first computing device for intended receipt by the second computing device, the third message having been encrypted using the public key of the second party in accordance with the identity based encryption operation, wherein the third message is intercepted by the functional element; and compute at the first computing device a secure key based on the second random key component, the secure key being used for conducting at least one call session with the second party via a media plane of the multimedia communication system; wherein the functional element is able to compute the same secure key;

wherein the first message, the second message and the third message comprise respective messages of an end-to-end key exchange between the first party and the second party—communicated in the media plane of an Internet Protocol Multimedia Subsystem; and wherein the first message is an INVITE message associated with the Internet Protocol Multimedia Subsystem.

* * * * *

UNITED STATES PATENT AND TRADEMARK OFFICE
CERTIFICATE OF CORRECTION

| | | |
|---|---|---|
| PATENT NO. | : 8,850,203 B2 | Page 1 of 1 |
| APPLICATION NO. | : 12/549932 | |
| DATED | : September 30, 2014 | |
| INVENTOR(S) | : G. S. Sundaram et al. | |

It is certified that error appears in the above-identified patent and that said Letters Patent is hereby corrected as shown below:

In the Specification

Column 12, lines 47-48, please change "MIKEY_MAKE" to -- MIKEY_IBAKE --

Column 12, line 66, please change "MIKEY_MAKE" to -- MIKEY_IBAKE --

Signed and Sealed this
Seventh Day of July, 2015

Michelle K. Lee
*Director of the United States Patent and Trademark Office*